United States Patent
Kemp, II et al.

(10) Patent No.: US 7,127,424 B2
(45) Date of Patent: Oct. 24, 2006

(54) CLICK BASED TRADING WITH INTUITIVE GRID DISPLAY OF MARKET DEPTH AND PRICE CONSOLIDATION

(75) Inventors: Gary Allan Kemp, II, Winnetka, IL (US); Harris Brumfield, Chicago, IL (US)

(73) Assignee: Trading Technologies International, Inc., Evanston, IL (US)

(*) Notice: Subject to any disclaimer, the term of this patent is extended or adjusted under 35 U.S.C. 154(b) by 78 days.

(21) Appl. No.: 09/971,087

(22) Filed: Oct. 5, 2001

(65) Prior Publication Data

US 2002/0099644 A1 Jul. 25, 2002

Related U.S. Application Data

(63) Continuation-in-part of application No. 09/590,692, filed on Jun. 9, 2000.

(60) Provisional application No. 60/238,001, filed on Oct. 6, 2000, provisional application No. 60/186,322, filed on Mar. 2, 2000.

(51) Int. Cl.
*G06F 17/60* (2006.01)

(52) U.S. Cl. .................. 705/37; 705/35; 705/36; 705/10; 705/14; 345/814

(58) Field of Classification Search .............. 705/35, 705/36, 37
See application file for complete search history.

(56) References Cited

U.S. PATENT DOCUMENTS

| | | | |
|---|---|---|---|
| 4,674,044 A | 6/1987 | Kalmus et al. | |
| 4,750,135 A | 6/1988 | Boilen | |
| 4,903,201 A | 2/1990 | Wagner | |
| 5,038,284 A | 8/1991 | Kramer | 364/408 |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. | |

(Continued)

FOREIGN PATENT DOCUMENTS

WO    WO 95/26005 A1    9/1995

(Continued)

OTHER PUBLICATIONS www.tradingtechnologies.com/products/xtrade_full.html.

(Continued)

*Primary Examiner*—Richard Weisberger
(74) *Attorney, Agent, or Firm*—Foley & Lardner LLP

(57) ABSTRACT

A method and system for reducing the time it takes for a trader to place a trade when electronically trading on an exchange, thus increasing the likelihood that the trader will have orders filled at desirable prices and quantities. The "Mercury" display and trading method of the present invention ensure fast and accurate execution of trades by displaying market depth on a vertical or horizontal plane, which fluctuates logically up or down, left or right across the plane as the market prices fluctuate. This allows the trader to trade quickly and efficiently. The price consolidation feature of the present invention, as described herein, enables a trader to consolidate a number of prices in order to condense the display. Such action allows a trader to view a greater range of prices and a greater number of orders in the market at any given time. By consolidating prices, and therefore orders, a trader reduces the risk of a favorable order scrolling from the screen prior to filling a bid or ask on that order at a favorable price.

12 Claims, 18 Drawing Sheets

U.S. PATENT DOCUMENTS

| | | | |
|---|---|---|---|
| 5,297,032 A | 3/1994 | Trojan et al. | |
| 5,689,651 A | 11/1997 | Lozman | |
| 5,774,877 A | 6/1998 | Patterson, Jr. et al. | |
| 5,793,301 A | 8/1998 | Patterson, Jr. et al. | |
| 5,797,002 A | 8/1998 | Patterson, Jr. et al. | |
| 5,845,266 A | 12/1998 | Lupien et al. | |
| 5,915,245 A | 6/1999 | Patterson, Jr. et al. | |
| 5,924,082 A | 7/1999 | Silverman et al. | |
| 5,924,083 A | 7/1999 | Silverman et al. | |
| 5,946,667 A | 8/1999 | Tull, Jr. et al. | |
| 5,963,923 A | 10/1999 | Garber | |
| 6,012,046 A | 1/2000 | Lupien et al. | |
| 6,014,643 A | 1/2000 | Minton | |
| 6,035,287 A | 3/2000 | Stallaert et al. | |
| 6,098,051 A | 8/2000 | Lupien et al. | |
| 6,131,087 A | 10/2000 | Luke et al. | |
| 6,134,535 A | 10/2000 | Belzberg | |
| 6,195,647 B1 | 2/2001 | Martyn et al. | |
| 6,272,474 B1 | 8/2001 | Garcia | |
| 6,278,982 B1 | 8/2001 | Korhammer et al. | |
| 6,282,521 B1 | 8/2001 | Howorka | 705/37 |
| 6,408,282 B1 | 6/2002 | Buist | |
| 2002/0023038 A1 | 2/2002 | Fritsch et al. | |
| 2002/0055899 A1 | 5/2002 | Williams | |
| 2002/0138401 A1 | 9/2002 | Allen et al. | |

FOREIGN PATENT DOCUMENTS

| | | |
|---|---|---|
| WO | WO99/30259 A1 | 6/1999 |
| WO | WO 00/52619 | 9/2000 |
| WO | WO 00/62187 | 10/2000 |
| WO | WO 00/65510 | 11/2000 |
| WO | WO 01/16830 | 3/2001 |
| WO | WO 01/16852 | 3/2001 |
| WO | WO 01/22315 | 3/2001 |
| WO | WO 01/88808 | 11/2001 |

OTHER PUBLICATIONS

Jim Kharouf et al., "A trading room with a view", Futures, Nov. 1998, 6 pages, vol. 27-No. 11.

USPTO Presentation, NASDAQ, Nov. 8, 2001, enclosed pp. 1-13.

FIG. 2

| | 201 | 202 | 203 | 204 | 205 | | | |
|---|---|---|---|---|---|---|---|---|
| | Contract | Depth | BidQty | BidPrc | AskPrc | AskQty | LastPrc | LastQty | Total |
| 1 | CDHO | ● | 785 | 7626 | 7627 | 21 | 7627 | 489 | 8230 |
| 2 | | | 626 | 7625 | 7629 | 815 | | | |
| 3 | | | 500 | 7624 | 7630 | 600 | | | |
| 4 | | | 500 | 7623 | 7631 | 2456 | | | |
| 5 | | | 200 | 7622 | 7632 | 800 | | | |

FIG. 3

| E/W | 10:48:44 | BidQ | AskQ | Prc | LTQ |
|---|---|---|---|---|---|
| | L 3 | | 104 | 99 | |
| | R 5 | | 24 | 98 | |
| | 720 | | 33 | 97 | |
| | × 10 | | 115 | 96 | |
| | 0 | | 32 | 95 | |
| | 10 1H | | 27 | 94 | |
| | 50 3H | | 63 | 93 | |
| S 0 W 24 | 1K 5H | | 45 | 92 | |
| S 0 W 7 | CLR | | 28 | 91 | |
| | × 10 | | 20 | 90 | 10 |
| | 17 ▽ | 18 | | 89 | |
| B 0 W 15 | CXL | 97 | | 88 | |
| B 0 W 13 | + − | 30 | | 87 | |
| | NET 0 | 43 | | 86 | |
| B 0 W 17 | NET REAL | 110 | | 85 | |
| | | 23 | | 84 | |
| | | 31 | | 83 | |
| | | 125 | | 82 | |
| | | 21 | | 81 | |

SYCOM FGBL DEC99

Labels: 1001, 1002, 1003, 1004, 1005, 1006 (columns); 1007, 1008, 1009, 1010, 1011, 1012, 1013, 1014, 1015, 1016, 1017, 1018, 1019, 1020, 1021

FIG. 4

| SYCOM FGBL DEC99 | | | | | |
|---|---|---|---|---|---|
| E/W | 10:48:44 | BidQ | AskQ | Prc | LTQ |
|  | L 3 |  | 104 | 99 |  |
|  | R 5 |  |  |  |  |
|  |  |  | 24 | 98 |  |
|  | 720 |  | 33 | 97 |  |
|  | ✕ 10 |  | 115 | 96 |  |
|  | 0 |  |  |  |  |
|  | 10 1H |  | 32 | 95 |  |
|  | 50 3H |  | 27 | 94 |  |
| S 10<br>W 14 | 1K 5H |  | 63 | 93 | 10 |
|  | CLR | 43 |  | 92 |  |
|  | ✕ 10 | 125 |  | 91 |  |
|  | 17 ▽ | 97 |  | 90 |  |
| B 0<br>W 15 | CXL | 18 |  | 89 |  |
| B 0<br>W 13 | + − | 97 |  | 88 |  |
|  | NET 0 | 30 |  | 87 |  |
| B 0<br>W 17 | NET REAL | 43 |  | 86 |  |
|  |  | 110 |  | 85 |  |
|  |  | 23 |  | 84 |  |
|  |  | 31 |  | 83 |  |
|  |  | 125 |  | 82 |  |
|  |  | 21 |  | 81 |  |

| E/W | 10:48:44 | | BidQ | AskQ | Prc | LTQ |
|---|---|---|---|---|---|---|
| | \multicolumn{2}{c\|}{SYCOM FGBL DEC99} | | | | |
| | L | 3 | | 104 | 99 | |
| | R | 5 | | 24 | 98 | |
| | \multicolumn{2}{c\|}{720} | | 33 | 97 | |
| | X | 10 | | 115 | 96 | |
| | \multicolumn{2}{c\|}{0} | | 32 | 95 | |
| | 10 | 1H | | 27 | 94 | |
| | 50 | 3H | | | | |
| S 0 W 24 | 1K | 5H | | 63 | 93 | |
| S 0 W 7 | \multicolumn{2}{c\|}{CLR} | | 45 | 92 | |
| | X | 10 | | 28 | 91 | |
| | 17 | ▼ | | 20 | 90 | 10 |
| B 0 W 15 | \multicolumn{2}{c\|}{CXL} | 18 | | 89 | |
| B 0 W 13 | + | - | 97 | | 88 | |
| | \multicolumn{2}{c\|}{NET 0} | 30 | | 87 | |
| B 0 W 17 | \multicolumn{2}{c\|}{NET REAL} | 43 | | 86 | |
| | | | 110 | | 85 | |
| | | | 23 | | 84 | |
| | | | 31 | | 83 | |
| | | | 125 | | 82 | |
| | | | 21 | | 81 | |

1206 → L
1205 → R
1204 → 17
1208 (E/W column)
1201 (BidQ), 1202 (AskQ), 1203 (Prc), 1207 (LTQ)

| | | 1704 | 1706 1708 | |
|---|---|---|---|---|
| 1281 | | | | 11 |
| X | 0 | | | 10 |
| | 1 | | | 09 |
| 10 | 1H | | | 08 |
| 50 | 3H | 1 | | 07 |
| 1K | 5H | 2 | | 06 |
| CLR | | | | 05 |
| X | 0 | 3 | | 04 |
| | 1 ▷ | 2 | | 03 |
| CXL | | 1 | | 02 |
| + − | | | | 01 |
| NET 0 | | 1 | | 00 |
| ☐ Phantom | | | | 99 |
| NET REAL | | | | |

(B0 W1, B0 W2, B0 W3, B0 W2, B0 W1, B0 W1 labels along bottom)

Fig. 13

| | | 1704 | 1706 1708 | |
|---|---|---|---|---|
| 1281 | | | | 11 |
| X | 0 | 1 | | 10 |
| | 10 | 1 | | 09 |
| 10 | 1H | 1 | | 08 |
| 50 | 3H | 1 | | 07 |
| 1K | 5H | 1 | | 06 |
| CLR | | 1 | | 05 |
| X | 0 | 1 | | 04 |
| | 10 ▷ | 1 | | 03 |
| CXL | | | | 02 |
| + − | | | | 01 |
| NET 0 | | | | 00 |
| ☐ Phantom | | | | 99 |
| NET REAL | | | | |

(B0 W1 labels along bottom across all columns)

| | | | | | | | | | | | | | |
|---|---|---|---|---|---|---|---|---|---|---|---|---|---|
| | 11 | 10 | 09 | 08 | 07 | 06 | 05 | 04 | 03 | 02 | 01 | 00 | 99 |
| | | | | | | | | | | 1 | 2 | 3 | 4 |
| 1281 | 0 / X | 1 | 10 / 1H | 50 / 3H | 1K / 5H | CLR | 0 / X | ▷ / 1 | CXL | +/− | NET 0 | ☐ Phantom | NET REAL |
| | | | | | | | | | B0 W1 | B0 W2 | B0 W3 | B0 W4 | |

Fig. 17

| | | | | | | | | | | | | | |
|---|---|---|---|---|---|---|---|---|---|---|---|---|---|
| | 11 | 10 | 09 | 08 | 07 | 06 | 05 | 04 | 03 | 02 | 01 | 00 | 99 |
| | | 4 | 3 | 2 | 1 | | | | | | | | |
| 1281 | 0 / X | 1 | 10 / 1H | 50 / 3H | 1K / 5H | CLR | 0 / X | ▷ / 1 | CXL | +/− | NET 0 | ☐ Phantom | NET REAL |
| | B0 W4 | B0 W3 | B0 W2 | B0 W1 | | | | | | | | | |

CLICK BASED TRADING WITH INTUITIVE GRID DISPLAY OF MARKET DEPTH AND PRICE CONSOLIDATION

This application claims the benefit of U.S. Provisional Application No. 60/238,001, filed Oct. 6, 2000 and is a continuation-in-part of U.S. application Ser. No. 09/590,692, filed Jun. 9, 2000, which claims the benefit of U.S. Provisional Application No. 60/186,322, filed Mar. 2, 2000.

BACKGROUND OF THE INVENTION

The present invention is directed to the electronic trading of commodities. Specifically, the invention provides a trader with a versatile and efficient tool for executing trades. It facilitates the display of and the rapid placement of trade orders within the market trading depth of a commodity, where a commodity includes anything that can be traded with quantities and/or prices.

At least 60 exchanges throughout the world utilize electronic trading in varying degrees to trade stocks, bonds, futures, options and other products. These electronic exchanges are based on three components: mainframe computers (host), communications servers, and the exchange participants' computers (client). The host forms the electronic heart of the fully computerized electronic trading system. The system's operations cover order-matching, maintaining order books and positions, price information, and managing and updating the database for the online trading day as well as nightly batch runs. The host is also equipped with external interfaces that maintain uninterrupted online contact to quote vendors and other price information systems.

Traders can link to the host through three types of structures: high speed data lines, high speed communications servers and the Internet. High speed data lines establish direct connections between the client and the host. Another connection can be established by configuring high speed networks or communications servers at strategic access points worldwide in locations where traders physically are located. Data is transmitted in both directions between traders and exchanges via dedicated high speed communication lines. Most exchange participants install two lines between the exchange and the client site or between the communication server and the client site as a safety measure against potential failures. An exchange's internal computer system is also often installed with backups as a redundant measure to secure system availability. The third connection utilizes the Internet. Here, the exchange and the traders communicate back and forth through high speed data lines, which are connected to the Internet. This allows traders to be located anywhere they can establish a connection to the Internet.

Irrespective of the way in which a connection is established, the exchange participants' computers allow traders to participate in the market. They use software that creates specialized interactive trading screens on the traders' desktops. The trading screens enable traders to enter and execute orders, obtain market quotes, and monitor positions. The range and quality of features available to traders on their screens varies according to the specific software application being run. The installation of open interfaces in the development of an exchange's electronic strategy means users can choose, depending on their trading style and internal requirements, the means by which they will access the exchange.

The world's stock, bond, futures and options exchanges have volatile products with prices that move rapidly. To profit in these markets, traders must be able to react quickly. A skilled trader with the quickest software, the fastest communications, and the most sophisticated analytics can significantly improve his own or his firm's bottom line. The slightest speed advantage can generate significant returns in a fast moving market. In today's securities markets, a trader lacking a technologically advanced interface is at a severe competitive disadvantage.

Irrespective of what interface a trader uses to enter orders in the market, each market supplies and requires the same information to and from every trader. The bids and asks in the market make up the market data and everyone logged on to trade can receive this information if the exchange provides it. Similarly, every exchange requires that certain information be included in each order. For example, traders must supply information like the name of the commodity, quantity, restrictions, price and multiple other variables. Without all of this information, the market will not accept the order. This input and output of information is the same for every trader.

With these variables being constant, a competitive speed advantage must come from other aspects of the trading cycle. When analyzing the time it takes to place a trade order for a given commodity, various steps contribute in different amounts to the total time required. Approximately 8% of the total time it takes to enter an order elapses between the moment the host generates the price for the commodity and the moment the client receives the price. The time it takes for the client application to display the price to the trader amounts to approximately 4%. The time it takes for a trade order to be transmitted to the host amounts to approximately 8%. The remainder of the total time it takes to place an order, approximately 80%, is attributable to the time required for the trader to read the prices displayed and to enter a trade order. The present invention provides a significant advantage during the slowest portion of the trading cycle—while the trader manually enters his order. Traders recognize that the value of time savings in this portion may amount to millions of dollars annually.

In existing systems, multiple elements of an order must be entered prior to an order being sent to market, which is time consuming for the trader. Such elements include the commodity symbol, the desired price, the quantity and whether a buy or a sell order is desired. The more time a trader takes entering an order, the more likely the price on which he wanted to bid or offer will change or not be available in the market. The market is fluid as many traders are sending orders to the market simultaneously. It fact, successful markets strive to have such a high volume of trading that any trader who wishes to enter an order will find a match and have the order filled quickly, if not immediately. In such liquid markets, the prices of the commodities fluctuate rapidly. On a trading screen, this results in rapid changes in the price and quantity fields within the market grid. If a trader intends to enter an order at a particular price, but misses the price because the market prices moved before he could enter the order, he may lose hundreds, thousands, even millions of dollars. The faster a trader can trade, the less likely it will be that he will miss his price and the more likely he will make money.

The "Mercury" display and trading method of the present invention ensure fast and accurate execution of trades by displaying market depth on a vertical or horizontal plane, which fluctuates logically up or down, left or right across the plane as the market prices fluctuates, while the display of the corresponding prices remains static. This allows the trader to trade quickly and efficiently.

One advantage of the static price column is that traders are more likely to enter orders at desired prices because the prices don't move on the screen. However, the physical size of a trader's computer screen imposes a limitation on the static price column in that only a finite number of prices can be displayed within that screen area.

Exchanges list the prices of commodities traded in the marketplace in small denominations, like $\frac{1}{32}^{nd}$ or $\frac{1}{64}^{th}$ of a dollar, or in decimals like 0.01. The smallest such denomination for each commodity is called a "tick." The static price column of Mercury can display each tick in price rows that make up the static price column. As the ticks become smaller, more price rows are required on the trader's computer screen to list all of them. For example, while only one field would be required to display a tick of one dollar, if that dollar was broken down into $64^{th}$'s, 64 price rows would now be required to display the same one dollar price range. As such, much of the space on a trader's computer screen might be monopolized to show activity in the marketplace within a small variance in price. Many traders find a small variance in price, like $\frac{1}{64}^{th}$ of a dollar, to be inconsequential. Those traders are willing to give up a display of the actual ticks available in a market in exchange for a wider range of prices. Similar display problems may occur when the market is volatile. In a volatile market, the difference between the best bid and the best ask (the spread) widens, and a wider spread results in a trader seeing less of the overall market on his computer screen due to the space restrictions.

SUMMARY OF THE INVENTION

The inventors have developed the present invention which overcomes the drawbacks of the existing trading systems and dramatically reduces the time it takes for a trader to place a trade when electronically trading on an exchange. This, in turn, increases the likelihood that the trader will have orders filled at desirable prices and quantities. The present invention consolidates the available ticks and the corresponding bid and ask quantities in the marketplace so that the trader sees a larger range of prices in the market. As a result of the consolidated price rows, the trader will also enter orders in a consolidated fashion by clicking on active trading fields in the Mercury display.

Specifically, the present invention is directed to a method of displaying and a graphical user interface for displaying the market depth of a commodity traded in a market. Both the method and the user interface include: dynamically displaying, in a bid display region, a plurality of consolidated bids for the commodity, each of the plurality of consolidated bids representing a plurality of bid quantities in the market for the commodity; dynamically displaying, in an ask display region, a plurality of consolidated asks for the commodity; each of said plurality of consolidated asks representing a plurality of ask quantities in the market for the commodity; and statically displaying consolidated prices corresponding to the plurality of consolidated bids and asks, each of the consolidated prices representing a plurality of prices for the commodity, wherein the pluralities of consolidated bids and asks are dynamically displayed in alignment with the consolidated prices corresponding thereto.

Also described herein is a method and system for placing trade orders using such displays. Specifically, the present invention includes a method and system of placing a trade order for a commodity, using a graphical user interface and a user input device and having preset parameters for trade orders. The method and system include: displaying the market depth of a commodity traded in a market, through a dynamic display, in a bid display region, of a plurality of consolidated bids for said commodity and, in an ask display region, of a plurality of consolidated asks for the commodity, aligned with a static display of consolidated prices corresponding thereto. The method and system also include initiating placement of a trade order of the commodity through a single action of the user input device with a pointer of the user input device positioned within at least one of the bid and ask display regions, wherein each of said plurality of consolidated bids and asks represents a plurality of bid and asks quantities, respectively, in the market for the commodity, wherein each of said consolidated prices represents a plurality of prices for the commodity and wherein the contents of the trade order are based in part upon the preset parameters and the position of the pointer at the time of the single action.

The inventors have developed the present invention, which builds upon the Mercury display described in parent application, and dramatically reduces the problems associated with the display of multiple prices when such prices are listed in small ticks.

This new feature consolidates the display of price information on the static price column of the Mercury electronic trading screen, thereby reducing the potential drawbacks associated with a fast moving marketplace that trades in small denominations.

The price consolidation feature of the present invention, as described herein, enables a trader to consolidate a number of prices in order to condense the display. Such action allows a trader to view a greater range of prices and a greater number of orders in the market at any given time. By consolidating prices, and therefore orders, a trader reduces the risk of a favorable order scrolling from the screen prior to his hitting a bid or ask on that order at its favorable price.

These embodiments, and others described in greater detail herein, provide the trader with improved efficiency and versatility in placing, and thus executing, trade orders for commodities in an electronic exchange. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which:

FIG. 2 illustrates screen display showing the inside market and the market depth of a given commodity being traded;

FIG. 3 illustrates the Mercury display of the present invention;

FIG. 4 illustrates the Mercury display at a later time showing the movement of values when compared to FIG. 3;

FIG. 5 illustrates a Mercury display with parameters set in order to exemplify the Mercury trading method;

FIGS. 11–18 illustrate various schemes for distributing a trade order; and

DETAILED DESCRIPTION OF THE INVENTION

As described with reference to the accompanying figures, the present invention provides a display and trading method to ensure fast and accurate execution of trades by displaying market depth on a vertical or horizontal plane, which fluctuates logically up or down, left or right across the plane as the market prices fluctuates. This allows the trader to place trade orders quickly and efficiently. A commodity's market depth is the current bid and ask prices and quantities in the market. The display and trading method of the invention increase the likelihood that the trader will be able to execute orders at desirable prices and quantities.

In the preferred embodiment, the present invention is implemented on a computer or electronic terminal. The computer is able to communicate either directly or indirectly (using intermediate devices) with the exchange to receive and transmit market, commodity, and trading order information. It is able to interact with the trader and to generate contents and characteristics of a trade order to be sent to the exchange. It is envisioned that the system of the present invention can be implemented on any existing or future terminal or device with the processing capability to perform the functions described herein. The scope of the present invention is not limited by the type of terminal or device used. Further, the specification refers to a single click of a mouse as a means for user input and interaction with the terminal display as an example of a single action of the user. While this describes a preferred mode of interaction, the scope of the present invention is not limited to the use of a mouse as the input device or to the click of a mouse button as the user's single action. Rather, any action by a user within a short period of time, whether comprising one or more clicks of a mouse button or other input device, is considered a single action of the user for the purposes of the present invention.

Figure 1:
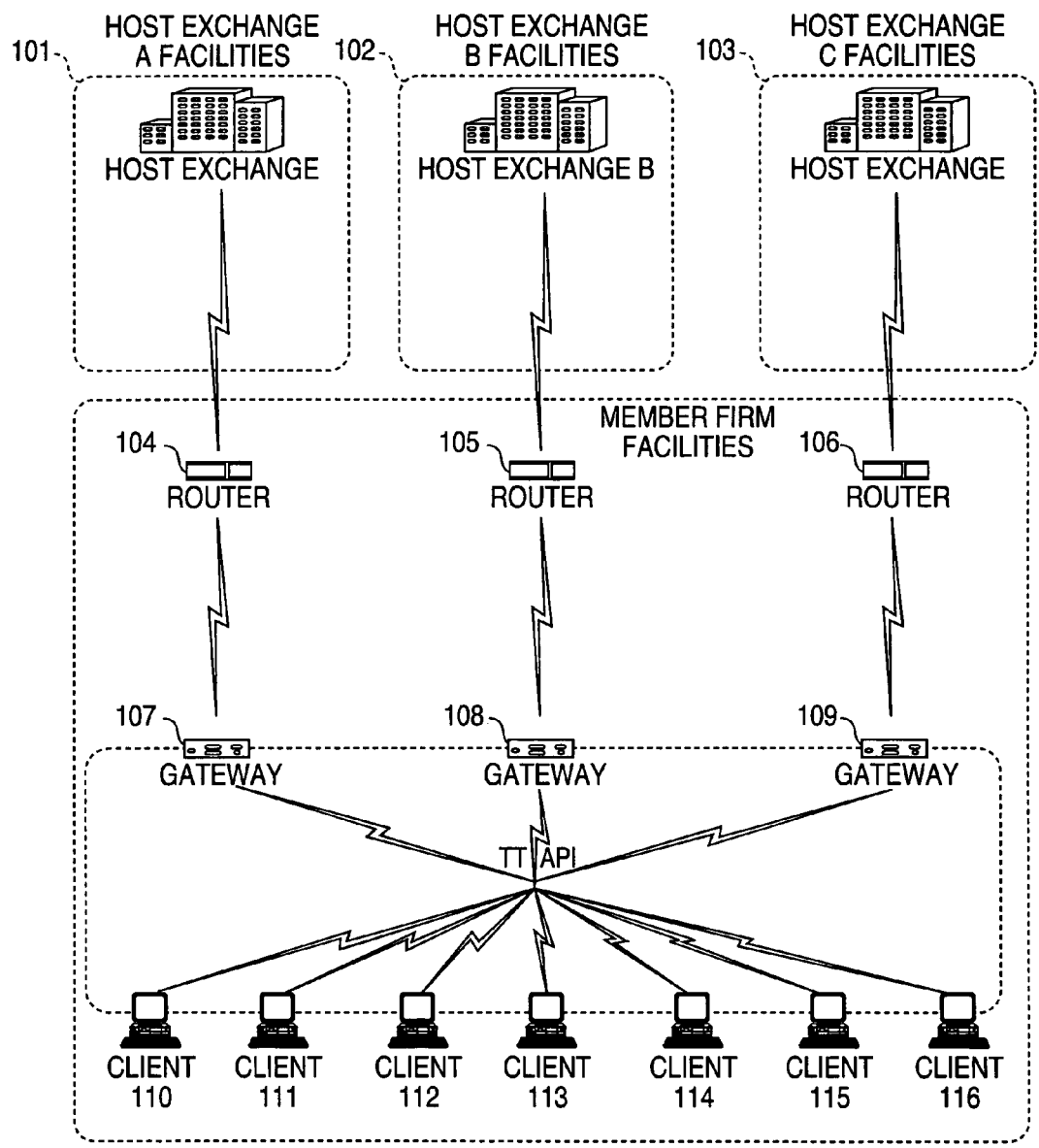
FIG. 1 illustrates the network connections between multiple exchanges and client sites.

The system can be configured to allow for trading in a single or in multiple exchanges simultaneously. Connection of the system of the present invention with multiple exchanges is illustrated in FIG. 1. This figure shows multiple host exchanges 101–103 connected through routers 104–106 to gateways 107–109. Multiple client terminals 110–116 for use as trading stations can then trade in the multiple exchanges through their connection to the gateways 107–109. When the system is configured to receive data from multiple exchanges, then the preferred implementation is to translate the data from various exchanges into a simple format. This "translation" function is described below with reference to FIG. 1. An applications program interface ("TT API" as depicted in the figure) translates the incoming data formats from the different exchanges to a simple preferred data format. This translation function may be disposed anywhere in the network, for example, at the gateway server, at the individual workstations or at both. In addition, the storage at gateway servers and at the client workstations, and/or other external storage cache historical data such as order books which list the client's active orders in the market; that is, those orders that have neither been filled nor cancelled. Information from different exchanges can be displayed at one or in multiple windows at the client workstation. Accordingly, while reference is made through the remainder of the specification to a single exchange to which a trading terminal is connected, the scope of the invention includes the ability to trade, in accordance with the trading methods described herein, in multiple exchanges using a single trading terminal.

The preferred embodiments of the present invention include the display of "Market Depth" and allow traders to view the market depth of a commodity and to execute trades within the market depth with a single click of a computer mouse button. Market Depth represents the order book with the current bid and ask prices and quantities in the market. In other words, Market Depth is each bid and ask that was entered into the market, subject to the limits noted below, in addition to the inside market. For a commodity being traded, the "inside market" is the highest bid price and the lowest ask price.

The exchange sends the price, order and fill information to each trader on the exchange. The present invention processes this information and maps it through simple algorithms and mapping tables to positions in a theoretical grid program or any other comparable mapping technique for mapping data to a screen. The physical mapping of such information to a screen grid can be done by any technique known to those skilled in the art. The present invention is not limited by the method used to map the data to the screen display.

How far into the market depth the present invention can display depends on how much of the market depth the exchange provides. Some exchanges supply an infinite market depth, while others provide no market depth or only a few orders away from the inside market. The user of the present invention can also chose how far into the market depth to display on his screen.

FIG. 2 illustrates a screen display of an invention described in a commonly owned co-pending application entitled "Click Based Trading with Market Depth Display" Ser. No. 09/589,751 filed on Jun. 9, 2000, the contents of which are incorporated herein by reference. This display shows the inside market and the market depth of a given commodity being traded. Row 1 represents the "inside market" for the commodity being traded which is the best (highest) bid price and quantity and the best (lowest) ask price and quantity. Rows 2–5 represent the "market depth" for the commodity being traded. In the preferred embodiment of the present invention, the display of market depth (rows 2–5) lists the available next-best bids, in column 203, and asks, in column 204. The working bid and ask quantity for each price level is also displayed in columns 202 and 205 respectively (inside market—row 1). Prices and quantities for the inside market and market depth update dynamically on a real time basis as such information is relayed from the market.

In the screen display shown in FIG. 2, the commodity (contract) being traded is represented in row 1 by the character string "CDHO". The Depth column 208 will inform the trader of a status by displaying different colors.

Yellow indicates that the program application is waiting for data. Red indicates that the program application has failed to receive the data from the server and has "timed out." Green indicates that the data has just been updated. The other column headings in this and all of the other figures, are defined as follows. BidQty (Bid Quantity): the quantity for each working bid, BidPrc (Bid Price): the price for each working bid, AskPrc (Ask Price): the price for each working ask, AskQty (Ask Quantity): the quantity for each working ask, LastPrc (Last Price): the price for the last bid and ask that were matched in the market and LastQty (Last Quantity): the quantity traded at the last price. Total represents the total quantity traded of the given commodity.

The configuration of the screen display itself informs the user in a more convenient and efficient manner than existing systems. Traders gain a significant advantage by seeing the market depth because they can see trends in the orders in the market. The market depth display shows the trader the interest the market has in a given commodity at different price levels. If a large amount of bids or asks are in the market near the trader's position, he may feel he should sell or buy before the inside market reaches the morass of orders. A lack of orders above or below the inside market might prompt a trader to enter orders near the inside market. Without seeing the market depth, no such strategies could be utilized. Having the dynamic market depth, including the bid and ask quantities and prices of a traded commodity aligned with and displayed below the current inside market of the commodity conveys the information to the user in a more intuitive and easily understandable manner. Trends in the trading of the commodity and other relevant characteristics are more easily identifiable by the user through the use of the present invention.

Various abbreviations are used in the screen displays, and specifically, in the column headings of the screen displays reproduced herein. Some abbreviations have been discussed above. A list of common abbreviations and their meanings is provided in Table 1.

TABLE I

Abbreviations

| COLUMN | DESCRIPTION | COLUMN | DESCRIPTION |
| --- | --- | --- | --- |
| Month | Expiration Month/Year | TheoBid | Theoretical Bid Price |
| Bid Mbr$_{(1)}$ | Bid Member ID | TheoAsk | Theoretical Ask Price |
| WrkBuys$_{(2)}$ | Working Buys for entire Group ID | QAct | Quote Action (Sends individual quotes) |
| BidQty | Bid Quantity | BQQ | Test Bid Quote Quantity |
| ThrshBid$_{(6)}$ | Threshold Bid Price | BQP | Test Bid Quote Price |
| BidPrc | Bid Price | Mkt BQQ | Market Bid Quote Quantity |
| Bid Qty Accum | Accumulated Bid Quantity | Mkt BQP | Market Bid Quote Price |
| BidPrc Avg | Bid Price Average | Quote | Checkbox activates/deactivates contract for quoting |
| AskPrc Avg | Ask Price Average | Mkt AQQ | Market Ask Quote Quantity |
| AskQty Accum | Accumulated Ask Quantity | Mkt AQP | Market Ask Quote Price |
| AskPrc | Ask Price | AQP | Ask Quote Price |
| ThrshAsk$_{(6)}$ | Threshold Ask Price | AQQ | Ask Quote Quantity |
| AskQty | Ask Quantity | Imp BidQty$_{(5)}$ | Implied Bid Quantity |
| WrkSells$_{(2)}$ | Working Sells for entire Group ID | Imp BidPrc$_{(5)}$ | Implied Bid Price |
| Ask Mbr$_{(1)}$ | Ask Member ID | Imp AskQty$_{(5)}$ | Implied Ask Quantity |
| NetPos | Net Position | Imp AskPrc$_{(5)}$ | Implied Ask Price |
| FFNetPos | Fast Fill Net Position | Gamma$_{(3)}$ | Change in Delta given 1 pt change in underlying |
| LastPrc | Last Price | Delta$_{(3)}$ | Change in price given 1 pt change in underlying |
| LastQty | Last Quantity | Vola$_{(3)}$ | Percent volatility |
| Total | Total Traded Quantity | Vega$_{(3)}$ | Price change given 1% change in Vola |
| High | High Price | Rho$_{(3)}$ | Price change given 1% change in interest rate |
| Low | Low Price | Theta$_{(3)}$ | Price change for every day that elapses |
| Open | Opening Price | Click Trd | Activate/deactivate click trading by contract |
| Close | Closing Price | S (Status) | Auction, Closed, FastMkt, Not Tradable, Pre-trading, Tradable, S = post-trading |
| Chng | Last Price-Last Close | Expiry | Expiration Month/Year |
| TheoPrc | Theoretical Price | | |

As described herein, the display and trading method of the present invention provide the user with certain advantages over systems in which a display of market depth, as shown in FIG. 2, is used. The Mercury display and trading method of the present invention ensure fast and accurate execution of trades by displaying market depth on a vertical or horizontal plane, which fluctuates logically up or down, left or right across the plane as the market prices fluctuates. This allows the trader to trade quickly and efficiently. An example of such a Mercury display is illustrated in the screen display of FIG. 3.

The display of market depth and the manner in which traders trade within the market depth can be effected in different manners, which many traders will find materially better, faster and more accurate. In addition, some traders may find the display of market depth to be difficult to follow.

In the display shown in FIG. 2, the market depth is displayed vertically so that both Bid and Ask prices descend the grid. The Bid prices descend the market grid as the prices decrease. Ask prices also descend the market grid as these prices actually increase. This combination may be considered counterintuitive and difficult to follow by some traders.

The Mercury display overcomes this problem in an innovative and logical manner. Mercury also provides an order entry system, market grid, fill window and summary of market orders in one simple window. Such a condensed display materially simplifies the trading system by entering and tracking trades in an extremely efficient manner. Mercury displays market depth in a logical, vertical fashion or horizontally or at some other convenient angle or configuration. A vertical field is shown in the figures and described for convenience, but the field could be horizontal or at an angle. In turn, Mercury further increases the speed of trading and the likelihood of entering orders at desired prices with desired quantities. In the preferred embodiment of the invention, the Mercury display is a static vertical column of prices with the bid and ask quantities displayed in vertical columns to the side of the price column and aligned with the corresponding bid and ask prices. An example of this display is shown in FIG. 3.

Bid quantities are in the column 1003 labeled BidQ and ask quantities are in column 1004 labeled AskQ. The representative ticks from prices for the given commodity are shown in column 1005. The column does not list the whole prices (e.g. 95.89), but rather, just the last two digits (e.g. 89). In the example shown, the inside market, cells 1020, is 18 (best bid quantity) at 89 (best bid price) and 20 (best ask quantity) at 90 (best ask price). In the preferred embodiment of the invention, these three columns are shown in different colors so that the trader can quickly distinguish between them.

The values in the price column are static; that is, they do not normally change positions unless a re-centering command is received (discussed in detail later). The values in the Bid and Ask columns however, are dynamic; that is, they move up and down (in the vertical example) to reflect the market depth for the given commodity. The LTQ column 1006 shows the last traded quantity of the commodity. The relative position of the quantity value with respect to the Price values reflects the price at which that quantity was traded. Column 1001 labeled E/W (entered/working) displays the current status of the trader's orders. The status of each order is displayed in the price row where it was entered. For example, in cells 1007, the number next to S indicates the number of the trader's ordered lots that have been sold at the price in the specific row. The number next to W indicates the number of the trader's ordered lots that are in the market, but have not been filled—i.e. the system is working on filling the order. Blanks in this column indicate that no orders are entered or working at that price. In cells 1008, the number next to B indicates the number of the trader's ordered lots that have been bought at the price in the specific row. The number next to W indicates the number of the trader's ordered lots that are in the market, but have not been filled—i.e. the system is working on filling the order.

Various parameters are set and information is provided in column 1002. For example, "10:48:44" in cell 1009 shows the actual time of day. The L and R fields in cell 1010 indicate a quantity value, which may be added to the order quantity entered. This process is explained below with respect to trading under Mercury. Below the L and R fields, in cell 1011, a number appears which represents the current market volume. This is the number of lots that have been traded for the chosen contract. Cell 1012, "X 10", displays the Net Quantity, the current position of the trader on the chosen contract. The number "10" represents the trader's buys minus sells. Cell 1013 is the "Current Quantity"; this field represents the quantity for the next order that the trader will send to market. This can be adjusted with right and left clicks (up and down) or by clicking the buttons which appear below the Current Quantity in cells 1014. These buttons increase the current quantity by the indicated amount; for example, "10" will increase it by 10; "1H" will increase it by 100; "1K" will increase it by 1000. Cell 1015 is the Clear button; clicking this button will clear the Current Quantity field. Cell 1016 is the Quantity Description; this is a pull down menu allowing the trader to chose from three Quantity Descriptions. The pull down menu is displayed when the arrow button in the window is clicked. The window includes NetPos, Offset and a field allowing the trader to enter numbers. Placing a number in this field will set a default buy or sell quantity. Choosing "Offset" in this field will enable the L/R buttons of cell 1010. Choosing "NetPos" in this field will set the current Net Quantity (trader's net position) as the trader's quantity for his next trade. Cell 1017 are +/− buttons; these buttons will alter the size of the screen— either larger (+) or smaller (−). Cell 1018 is used to invoke Net 0; clicking this button will reset the Net Quantity (cell 1101) to zero. Cell 1019 is used to invoke Net Real; clicking this button will reset the Net Quantity (cell 1011) to its actual position.

The inside market and market depth ascend and descend as prices in the market increase and decrease. For example, FIG. 4 shows a screen displaying the same market as that of FIG. 3 but at a later interval where the inside market, cells 1101, has risen three ticks. Here, the inside market for the commodity is 43 (best bid quantity) at 92 (best bid price) and 63 (best ask quantity) at 93 (best ask price). In comparing FIGS. 3 and 4, it can be seen that the price column remained static, but the corresponding bids and asks rose up the price column. Market Depth similarly ascends and descends the price column, leaving a vertical history of the market.

As the market ascends or descends the price column, the inside market might go above or below the price column displayed on a trader's screen. Usually a trader will want to be able to see the inside market to assess future trades. The system of the present invention addresses this problem with a one click centering feature. With a single click at any point within the gray area, 1021, below the "Net Real" button, the system will re-center the inside market on the trader's screen. Also, when using a three-button mouse, a click of the middle mouse button, irrespective of the location of the mouse pointer, will re-center the inside market on the trader's screen.

The same information and features can be displayed and enabled in a horizontal fashion. Just as the market ascends and descends the vertical Mercury display shown in FIGS. 3 and 4, the market will move left and right in the horizontal Mercury display. The same data and the same information gleaned from the dynamical display of the data is provided. It is envisioned that other orientations can be used to dynamically display the data and such orientations are intended to come within the scope of the present invention.

Display Using Price Consolidation

The price consolidation feature of the present invention is used to condense a large number of price rows into a more manageable number of price rows, resulting in more expedient trading. By consolidating prices, and therefore orders, a trader reduces the risk of a favorable order scrolling from the screen prior to his hitting a bid or ask on that order at its favorable price.

Figure 7A:
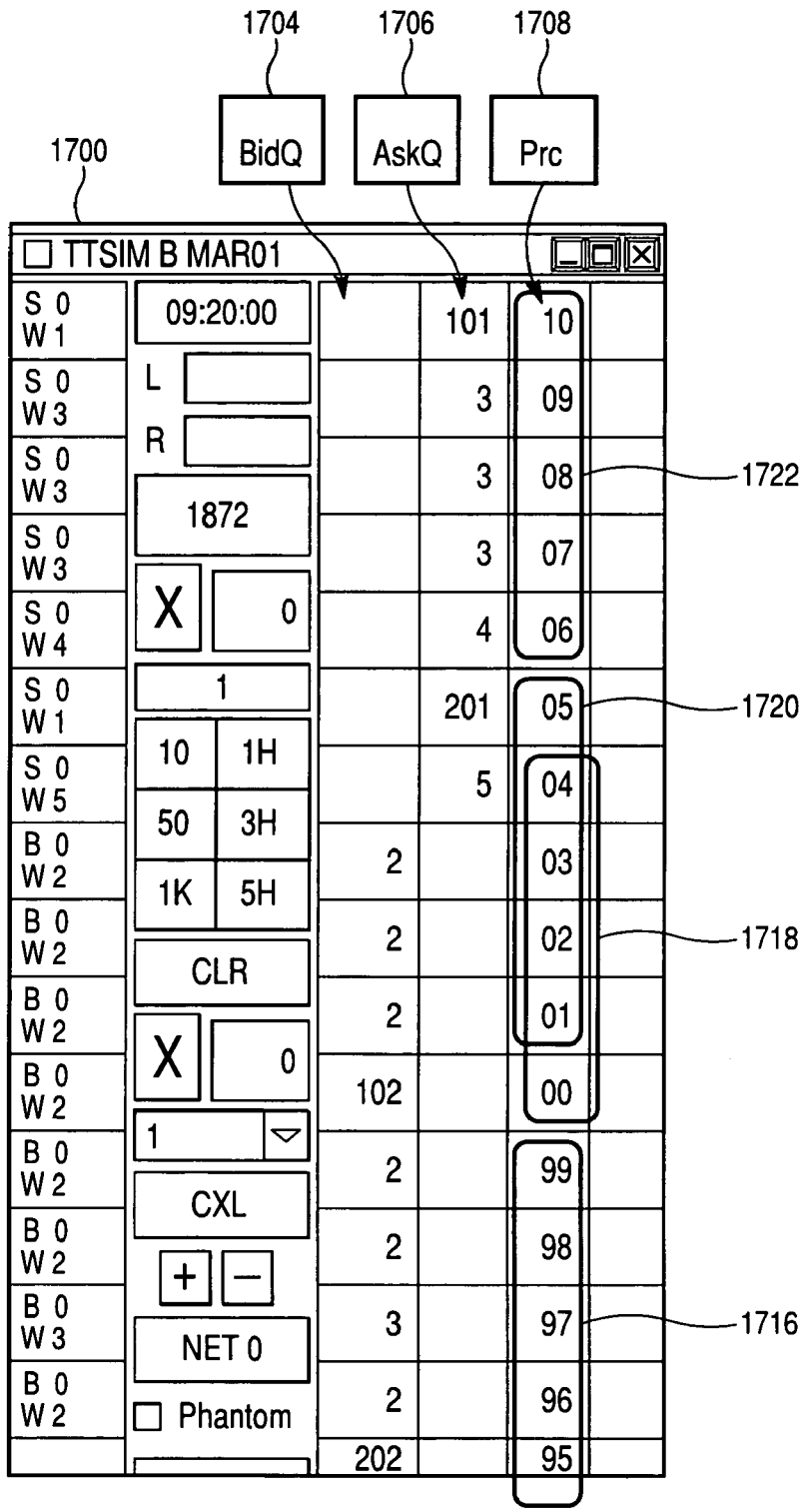
FIGS. 7A and 7B show corresponding displays before and after price consolidation.
Figure 7B:
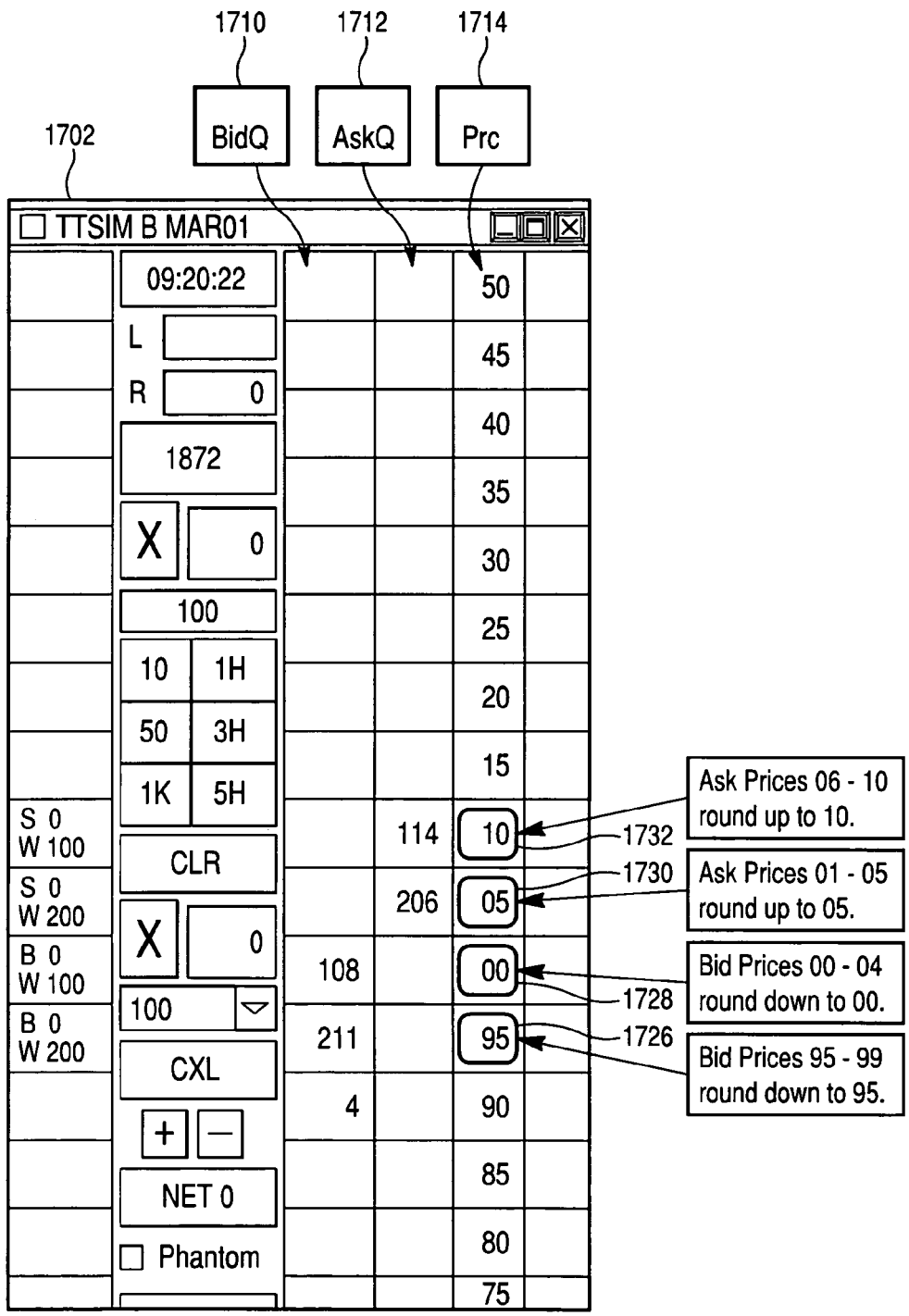

The present invention provides a display and graphical user interface on which order and price information is displayed and from which order and price information can be sent to electronic markets. FIG. 7A shows an unconsolidated screen 1700 while FIG. 7B shows a consolidated screen 1702 under the present invention. There are three primary areas that are of interest in the consolidation of prices—the Bid Quantity (BidQ) column 1704, 1710, the Ask Quantity (AskQ) column 1706, 1712, and the Price (Prc) column 1708, 1714. In the preferred embodiment, the display has a vertical orientation and these display regions are shown as columns, as is evident in the figures. However, in other embodiments, these display regions could be horizontal rows or some other shape and orientation.

The Bid Quantity column lists the total amount of working bids in the market at the corresponding price rows. As discussed above, a "bid" is an order to buy a given quantity of a commodity at a given price. The Ask Quantity column lists the total amount of working asks in the market at the corresponding price rows. An "ask" is an order to sell a given quantity of a commodity at a given price. The Price column lists the prices (ticks) for the chosen commodity.

Typically, markets provide prices in ticks. The static price column of the Mercury trading screen can display as many such ticks as the trader's screen will allow. The present invention makes it possible to expand the price range displayed by consolidating the price rows as much as the trader desires. The trader designates a finite number of ticks (e.g. 5) to be consolidated into a single consolidated price row, and the present invention will consolidate the price rows accordingly.

While the static price column will simply display the prices in the increments chosen by the trader, each price in the range corresponding to a consolidated price row will be rounded up or down depending on whether the price is considered in relation to an ask or a bid quantity. If considered in relation to an ask quantity, the price will round up (or remain equal) to the nearest consolidated price row, and if considered in relation to a bid quantity, the price will round down (or remain equal) to the nearest consolidated price row.

FIGS. 7A and 7B illustrate the consolidation of the prices from the unconsolidated display 1700 to the consolidated display 1702. In the displays shown, the range of prices 95–99 (1716) corresponding to bids consolidate to price 95 (1726). The range of prices 00–04 (1718) corresponding to bids consolidate to price 00 (1728). The range of prices 01–05 (1720) corresponding to asks consolidate to price 05 (1730). The range of prices 06–10 (1722) corresponding to asks consolidate to price 10 (1732). For example, the 04 price in the 1720 range is rounded up to 05 when considered in relation to the ask quantity in the market. The 05 price is included in the 05 consolidated price row when considered in relation to the ask quantity in the market. The remaining prices in range 1720 (03, 02, and 01) are irrelevant when considering the prices of asks in the market because there are no ask quantities in the market.

Conversely, prices 03, 02, 01, and 00 in the range 1718 are rounded down to 00 as the next lowest consolidated price row in relation to the bid quantities in the market. Price 04 of range 1718 is irrelevant when considering the prices of bids in the market because there are no corresponding bid quantities in the market.

The user, under the present invention, has the ability to offset the starting point for the consolidation of prices. This display of prices depends both on the manner in which each exchange provides the price information and the user's preferences. The prices may be displayed on the screen in ticks, fractions of ticks, or in currency (dollars, Euros, etc.). Regardless of the manner in which prices are displayed, the calculations performed to effect the present invention assume that the prices are in ticks. For example, if the market tick size is 0.25, but a trader is trading in dollars and enters an order of $10, the invention will view the trader's order as 40 ticks when performing calculations (0.25× 40=10). The starting point for the display of the consolidation of prices automatically defaults to the zero price level, but it may be offset to any price level from zero to one less than the range size (increment) chosen by the user. For example, if the trader chose to consolidate the price row into groups of five, the starting point could be any integer from 0 through 4, since 4 is one less than the maximum group size of 5. From that starting point, the static price row will ascend and descend. This enables the trader to group price rows at any tick offset. For example, if the market tick size is 0.25 (i.e. $0.25) the price row will ascend as follows: 0.25, 0.50, 0.75, 1.00, 1.25, etc. If the trader wanted to display the price row in increments of 1.0 (e.g. 1.00, 2.00, 3.00, 4.00, etc.), he would choose to consolidate the price row into groups of 4 since 0.25 goes into 1.00 four times. Starting at the default starting point of zero, the price row would then ascend as follow: 1.00, 2.00, 3.00, 4.00, etc. Now assume that this same trader, still wanting to trade in increments 1.00, would rather trade with the price row displaying prices at the 0.5 point. He would then set the tick offset to 2 ticks (equivalent to an offset of 0.5 where the tick size is 0.25). This is possible because 0.50 would fall into a price level between zero and one less than the range size of 4. Due to the offset, the consolidation would begin at 0.50 with 0.50, 0.75, 1.00, and 1.25 being the prices in the first consolidated price group (this group would be displayed on the screen as the 0.50 price level). All of the ascending price groups, beginning at 1.50, would now be in increments of 1.00 (groups of four 0.25 price levels) and will ascend the price row as follows: 0.50, 1.50, 2.50, 3.50, 4.50, etc.

Note that in the figures of the present specification, no offset has been used.

The following equations are used to determine what consolidated price would correspond to a given bid or ask price:

P=Price (in ticks)
N=Variable increment chosen by the trader (number of ticks per consolidated price)
Bcp=Consolidated price row with corresponding bid quantity (in ticks)
Acp=Consolidated price row with corresponding ask quantity (in ticks)
Int=Integer Function
Os=Offset (# of ticks)
Bcp=Int((P−Os)/N)N+Os
Acp=Int(((P−Os)+N−1)/N)N+Os At the end of the calculations, the result, which is in the units of ticks, is displayed on the screen in ticks or converted to a format/unit desired by the user in a manner as set forth above with respect to the conversion to ticks.

As the price column is condensed, the corresponding bid and ask quantities in the market also are condensed with their corresponding consolidated prices. Bid quantities in the market are consolidated into the lowest corresponding price row. Conversely, ask quantities in the market are consolidated into the highest corresponding price row. Such consolidation is demonstrated in FIGS. 8A and 8B. The screen displayed on the right (1702) shows a consolidated price column 1714 and the corresponding consolidated bid 1710 and ask 1712 quantities. The bid quantities in the market are consolidated to the lowest corresponding price (00, 95, 90, 85 etc.), while the ask quantities are consolidated to their highest corresponding price (05, 10, 15, 20 etc.).

Figure 8A:
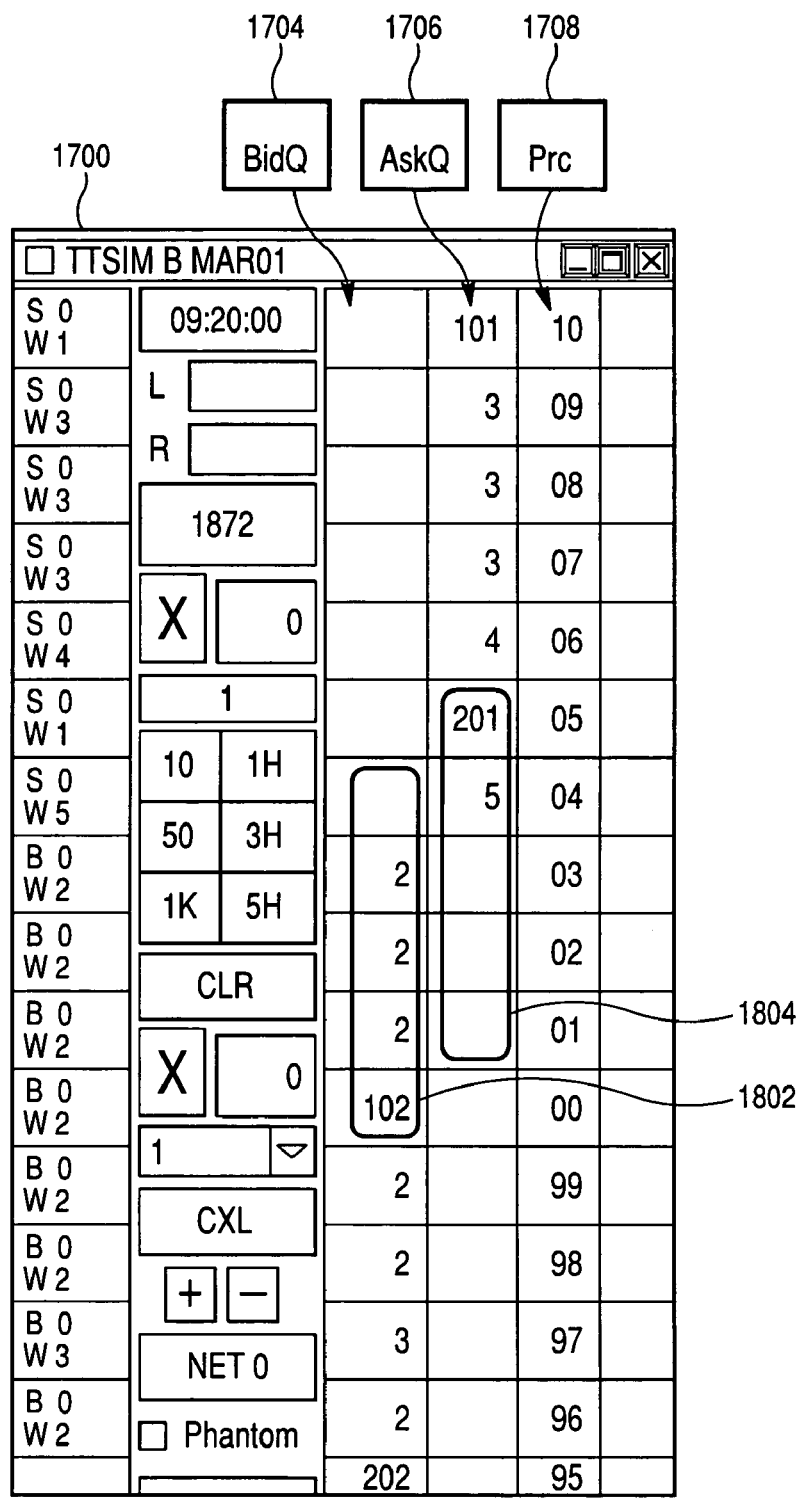
FIGS. 8A and 8B illustrate the consolidation of bid and ask quantities.
Figure 8B:
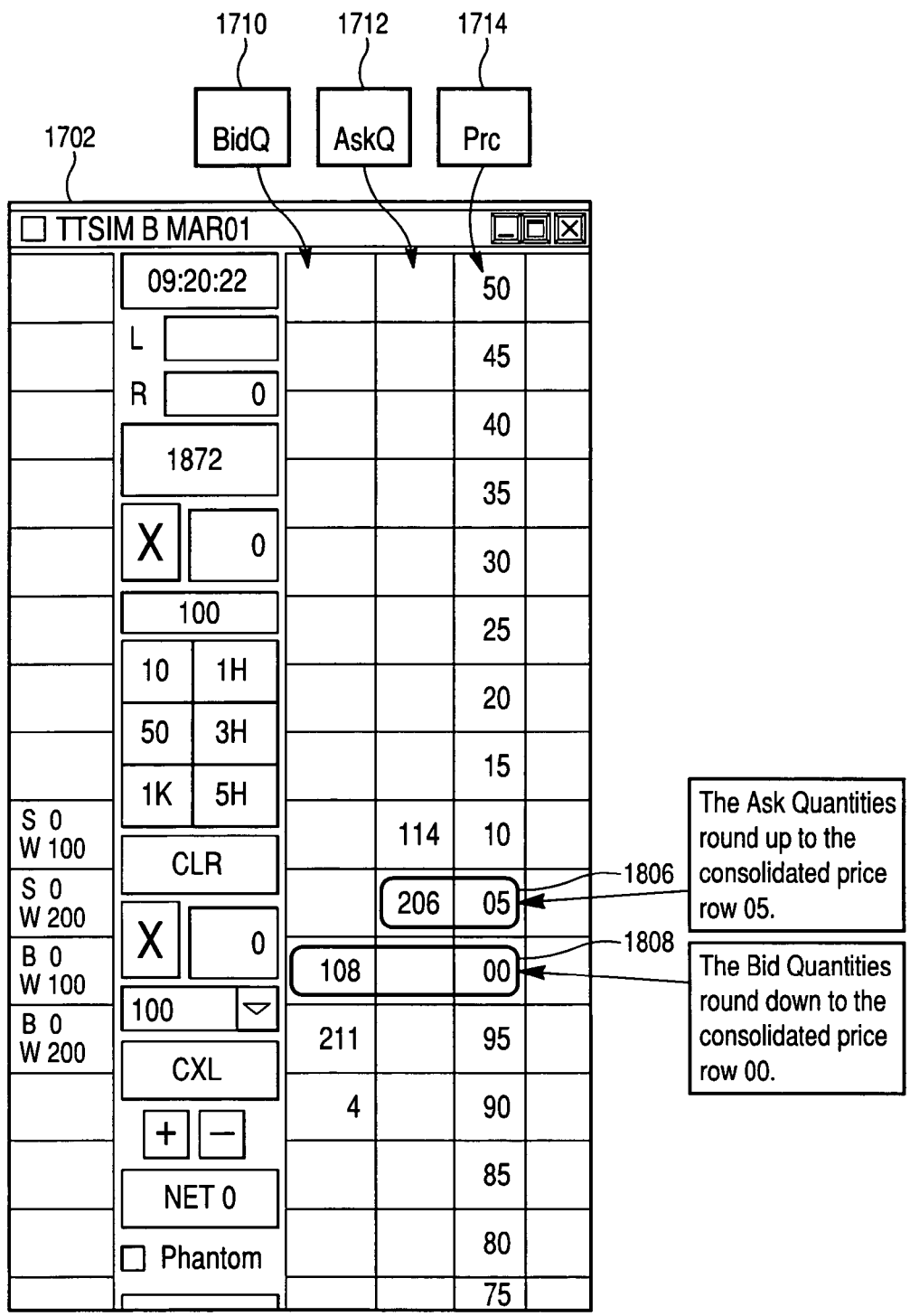

As will often be the case, and as illustrated by FIGS. 8A and 8B, the inside market may fall within a consolidated price row. In other words, the inside market prices—03 and 04 in price column 1708—are between the consolidated price rows—00 and 05 in price column 1714. The rounding principle set forth above still applies in this scenario. As a result, all of the bid quantities in the relevant range 1802 (here one of the bid quantities is 0, because it is above the inside market) will correspond to the consolidated price row "00" (1808), which now displays a consolidated bid quantity of 108 which is the sum of the bid quantities in the price range 00–04. All of the ask quantities in the relevant range 1804 (here three of the ask quantities are 0, because they are below the inside market) will correspond to the condensed price row "05" (1806), which now displays a condensed ask quantity of 206 which is the sum of the ask quantities in the price range of 01–05.

Placing Trade Orders

Next, trading commodities, and specifically, the placement of trade orders using the Mercury display is described. Using the Mercury display and trading method, a trader would first designate the desired commodity and, if applicable, the default quantities. Then he can trade with single clicks of the right or left mouse button. The following equations are used by the system to generate trade orders and to determine the quantity and price to be associated with the trade order. The following abbreviations are used in these formulas: P=Price value of row clicked (in ticks), R=Value in R field, L=Value in L field, Q=Current Quantity, $Q_a$=Total of all quantities in AskQ column at an equal or better price than P, $Q_b$=Total of all quantities in BidQ column at an equal or better price than P, N=Current Net Position, Bo=Buy order sent to market and So=Sell order sent to market.

Any order entered using right mouse button $$Bo=(Q_a+R)P \quad \text{(Eq. 1)}$$

If BidQ field clicked.

$$So=(Q_b+R)P \quad \text{(Eq. 2)}$$

If AskQ field clicked.

Orders Entered Using the Left Mouse Button

If "Offset" mode chosen in Quantity Description field then (note, this Offset is different than the offset described above with respect to price consolidation):

$$Bo=(Q_a+L)P \quad \text{(Eq. 3)}$$

If BidQ field clicked.

$$So=(Q_b+L)P \quad \text{(Eq. 4)}$$

If AskQ field clicked.

If "number" mode chosen in Quantity Description field then:

$$Bo=QP \quad \text{(Eq. 5)}$$

$$So=QP \quad \text{(Eq. 6)}$$

If "NetPos" mode chosen in Quantity Description field then:

$$Bo=NP \quad \text{(Eq. 7)}$$

$$So=NP \quad \text{(Eq. 8)}$$

Orders can also be sent to market for quantities that vary according to the quantities available in the market; quantities preset by the trader; and which mouse button the trader clicks. Using this feature, a trader can buy or sell all of the bids or asks in the market at or better than a chosen price with one click. The trader could also add or subtract a preset quantity from the quantities outstanding in the market. If the trader clicks in a trading cell—i.e. in the BidQ or AskQ column, he will enter an order in the market. The parameters of the order depend on which mouse button he clicks and what preset values he set.

Using the screen display and values from FIG. 5, the placement of trade orders using the Mercury display and trading method is now described using examples. A left click on the 18 in the BidQ column 1201 will send an order to market to buy 17 lots (quantity # chosen on the Quantity Description pull down menu cell 1204) of the commodity at a price of 89 (the corresponding price in the Prc column 1203). Similarly, a left click on the 20 in the AskQ column 1202 will send an order to market to sell 17 lots at a price of 90.

Using the right mouse button, an order would be sent to market at the price that corresponds to the row clicked for the total quantity of orders in the market that equal or better the price in that row plus the quantity in the R field 1205. Thus, a right click in the AskQ column 1202 in the 87 price row will send a sell order to market at a price of 87 and a quantity of 150. 150 is the sum of all the quantities 30, 97, 18 and 5. 30, 97 and 18 are all of the quantities in the market that would meet or better the trader's sell order price of 87. These quantities are displayed in the BidQ column 1201 because this column represents the orders outstanding in the market to purchase the commodity at each corresponding price. The quantity 5 is the quantity pre-set in the R field 1205.

Similarly, a right click in the BidQ column 1201 at the same price level of 87 would send a buy limit order to market for a quantity of 5 at a price of 87. The quantity is determined in the same manner as above. In this example, though, there are no orders in the market that equal or better the chosen price—there are no quantities in the AskQ column 1202 that equal or better this price. Therefore, the sum of the equal or better quantities is zero ("0"). The total order entered by the trader will be the value in the R field, which is 5.

An order entered with the left mouse button and the "Offset" option chosen in the quantity description field 1204 will be calculated in the same way as above, but the quantity in the L field 1206 will be added instead of the quantity in the R field 1205. Thus, a left click in the BidQ column 1201 in the 92 price row will send a buy order to market at a price of 92 and a quantity of 96. 96 is the sum of all the quantities 45, 28, 20 and 3. 45, 28 and 20 are all quantities in the market that would meet or better the trader's buy order price of 92. These quantities are displayed in the AskQ column 1202 because this column represents the orders outstanding in the market to sell the commodity at each corresponding price. The quantity 3 is the quantity pre-set in the L field 1206.

The values in the L or R fields may be negative numbers. This would effectively decrease the total quantity sent to market. In other words, in the example of a right click in the AskQ column 1202 in the 87 price row, if the R field was −5, the total quantity sent to market would be 140(30+97+18+ (−5)).

If a trader chose the "NetPos" option in the quantity description field 1204, a right click would still work as explained above. A left click would enter an order with a price corresponding to the price row clicked and a quantity equal to the current Net position of the trader. The Net position of the trader is the the trader's current position on the chosen contract. In other words, if the trader has bought 10 more contracts than he has sold, this value would be 10. NetPos would not affect the quantity of an order sent with a right click.

If the trader chose a number value in the quantity description, a left click would send an order to market for the current quantity chosen by the trader. The default value of the current quantity will be the number entered in the quantity description field, but it could be changed by adjusting the figure in the current quantity field 1204.

This embodiment of the invention also allows a trader to delete all of his working trades with a single click of either the right or left mouse button anywhere in the last traded quantity (LTQ) column 1207. This allows a trader to exit the market immediately. Traders will use this feature when they are losing money and want to stop the losses from piling up. Traders may also use this feature to quickly exit the market upon making a desired profit. The invention also allows a trader to delete all of his orders from the market at a particular price level. A click with either mouse button in the Entered/Working (E/W) column 1208 will delete all working orders in the cell that was clicked. Thus, if a trader believes that previously sent orders at a particular price that have not been filled would be poor trades, he can delete these orders with a single click.

Figure 6:
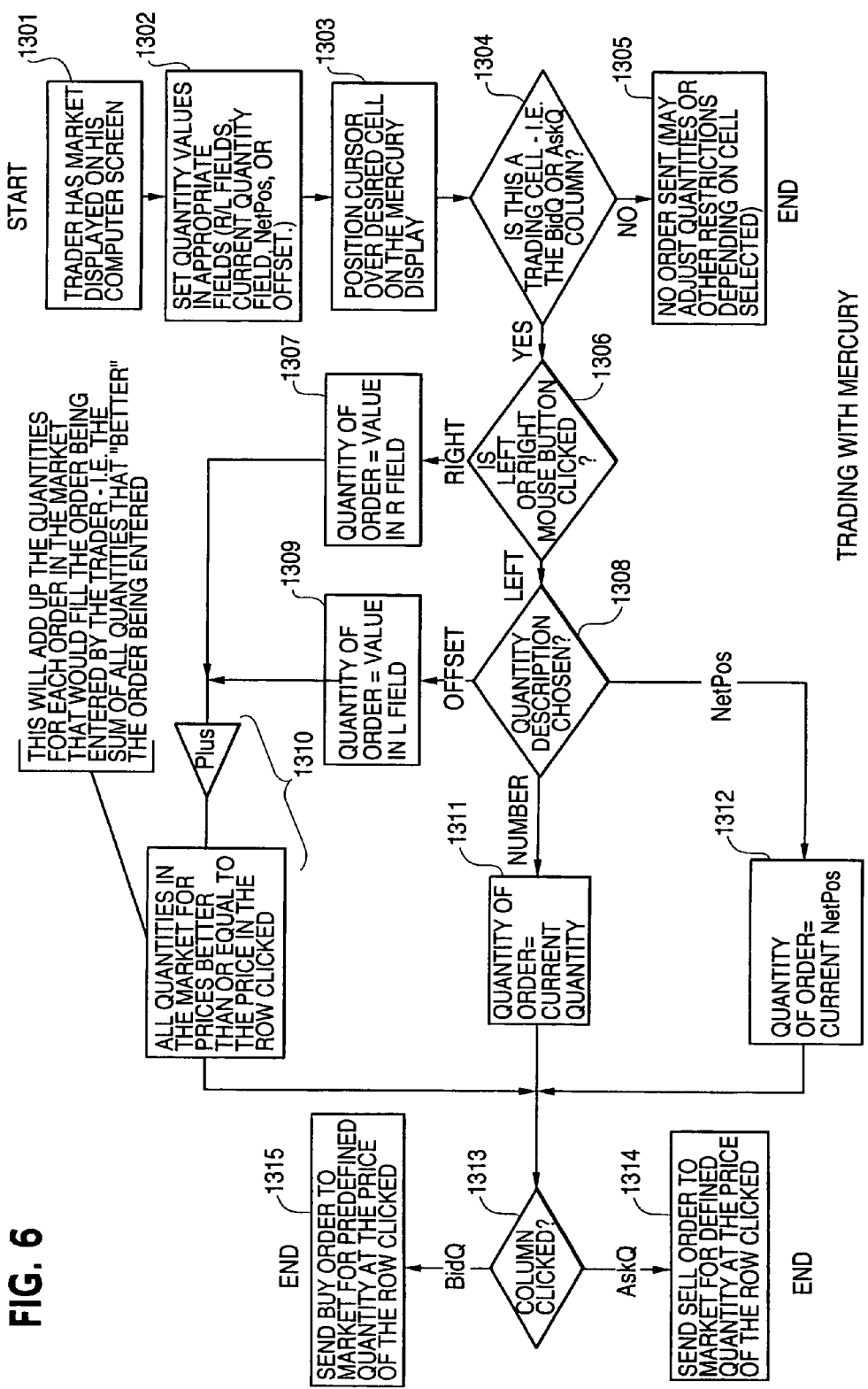
FIG. 6 is a flowchart illustrating the process for Mercury display and trading.

The process for placing trade orders using the Mercury display and trading method of the present invention as described above is shown in the flowchart of FIG. 6. First, in step 1301, the trader has the Mercury display on the trading terminal screen showing the market for a given commodity. In step 1302, the parameters are set in the appropriate fields, such as the L and R fields and the Current Quantity, NetPos or Offset fields from the pull down menu. In step 1303, the mouse pointer is positioned and clicked over a cell in the Mercury display by the trader. In step 1304, the system determines whether the cell clicked is a tradeable cell (i.e. in the AskQ column or BidQ column). If not, then in step 1305, no trade order is created or sent and, rather, other quantities are adjusted or functions are performed based upon the cell selected. Otherwise, in step 1306, the system determines whether it was the left or the right button of the mouse that was clicked. If it was the right, then in step 1307, the system will use the quantity in the R field when it determines the total quantity of the order in step 1310. If the left button was clicked, then in step 1308, the system determines which quantity description was chosen: Offset, NetPos or an actual number.

If Offset was chosen, then the system, in step 1309, will use the quantity in the L field when it determines the total quantity of the order in step 1310. If NetPos was chosen, then the system, in step 1312, will determine that the total quantity for the trade order will be the current NetPos value, i.e. the net position of the trader in the given commodity. If an actual number was used as the quantity description, then, in step 1311, the system will determine that the total quantity for the trade order will be the current quantity entered. In step 1310, the system will determine that the total quantity for the trade order will be the value of the R field (if step 1307 was taken) or the value of the L field (if step 1309 was taken) plus all quantities in the market for prices better than or equal to the price in the row clicked. This will add up the quantities for each order in the market that will fill the order being entered by the trader (plus the L or R value).

After either steps 1310, 1311 or 1312, the system, in step 1313, determines which column was clicked, BidQ or AskQ. If AskQ was clicked, then, in step 1314, the system sends a sell limit order to the market at the price corresponding to the row for the total quantity as already determined. If BidQ was clicked, then, in step 1315, the system sends a buy limit order to the market at the price corresponding to the row for the total quantity as already determined.

Placing Trade Orders Using Price Consolidation

Now, placing trade orders using the price consolidation feature of the present invention is described. The method and single actions used in placing trade orders are the same as described above. Under price consolidation, however, the contents of the trade order are different than when the price consolidation feature is not used. Specifically, the price or prices at which orders and the quantities for which they are placed differ from that described above.

Figure 9:
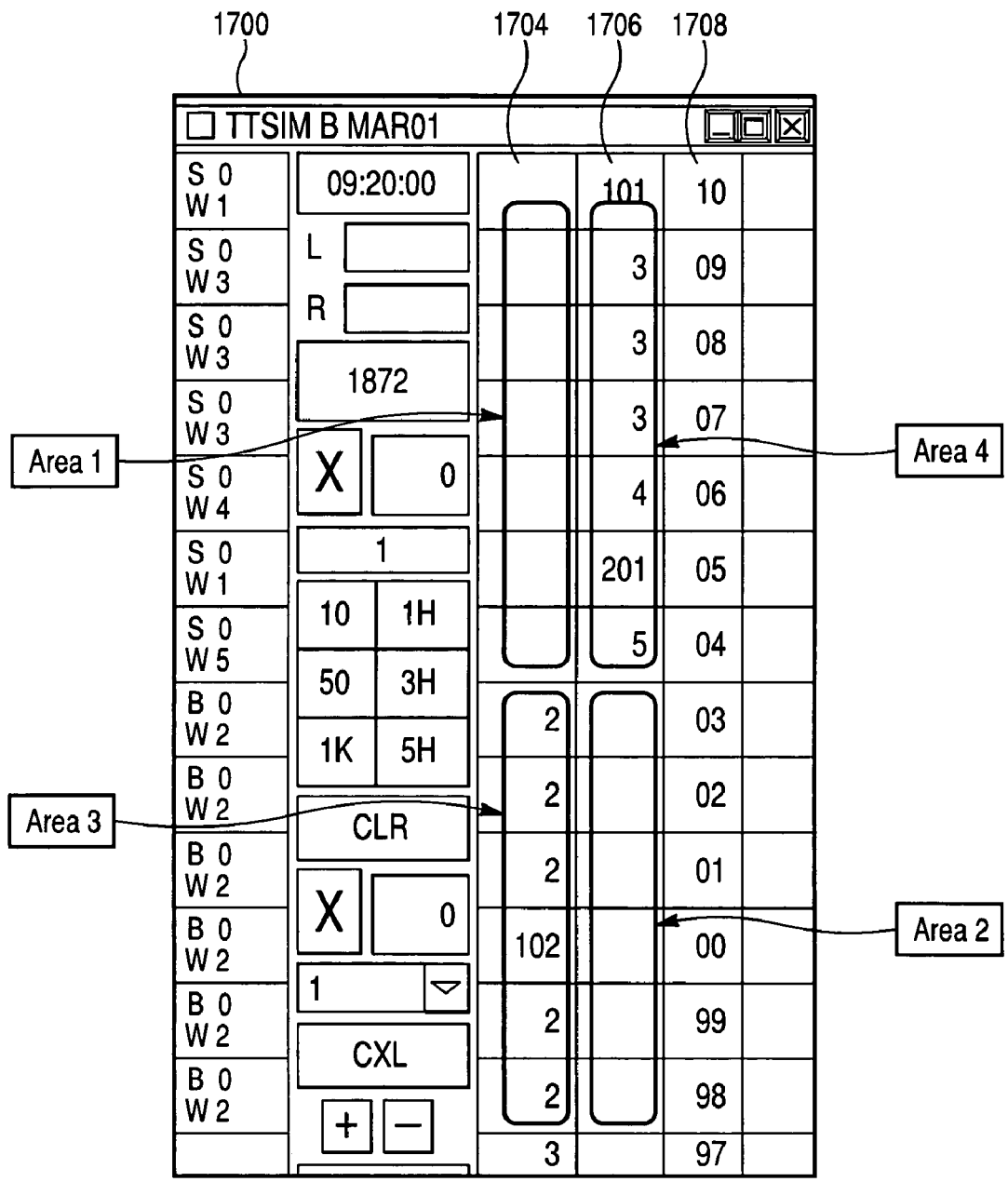
FIG. 9 illustrates different areas of the display of the present invention wherein trade orders can be placed.

FIG. 9 illustrates an unconsolidated display 1700 under the present invention. Within the bid 1704 and ask 1706 columns of the display of the present invention, there are essentially four distinct areas in which a trader can click to send an order to the market. These are shown as Areas 1–4 in FIG. 9. Two are within the bid display region (1704) and two are within the ask display region (1706). Clicking on an active cell within one of the areas will enter an order that either "joins" the market, "hits" an existing bid, or "takes" an existing ask. If either hitting a bid or taking an ask, then such orders will likely be immediately filled in the market. While these areas are shown in relation to an unconsolidated display, they are meant to refer, for the purposes of the present specification, to corresponding areas in the consolidated displays as well. Accordingly, Area 1 is meant to refer to the cells in the bid display region corresponding to prices at or above the inside market. Area 2 refers to the cells in the ask display region corresponding to prices at or below the inside market. Area 3 refers to the cells in the bid display region corresponding to prices at or below the inside market. Area 4 refers to the cells in the ask display region corresponding to prices at or above the inside market.

Using the display of the present invention without price consolidation, a trader clicking on a specific row in area 1, will send a limit order to buy at the price corresponding to that row or at a better price. This order will "take" existing asks and will likely be immediately filled in the market. Similarly, by clicking on a specific row in area 2, a trader will send a limit order to sell at the price corresponding to that row or at a better price. This order will "hit" existing bids in the market and will likely be immediately filled in the market.

When a trader sends a buy or sell order to market by clicking in a row where prices have been consolidated, a limit order will be sent to the exchange to be filled at the best price[s] available from the clicked price row to the inside market. For example, referring again to FIGS. 8A and 8B, if a trader clicks in the AskQ column 1712 in the "00" consolidated price row 1808, and his preset quantity is 100, his order will be filled as follows: 2 at a price of 03, 2 at a price of 02, 2 at a price of 01, and 94 at a price of 00 (see range 1802). If the trader clicks in the BidQ column 1710 in the "05" consolidated price row 1806, and his preset quantity is 100, his order will be filled as follows: 5 at a price of 04 and 95 at a price of 05 (see range 1804).

In the consolidated display 1702, when clicking in either area 1 or area 2 with consolidated price rows, the present innovation carries out a 2-step process. Step 1 involves sending an order to the market up to the quantity of orders available in the market at the desired price or better. If the quantity of the order is for less than the quantity available in the market, then the order will be filled completely. However, if the order quantity is for more than the quantity available in the market, step 1 will result in filling only the quantity available at the desired price or better (therefore "taking out" the market). In this case, Step 2 will be performed whereby the remaining quantity will "join" the market in accordance with the distribution scheme selected by the trader (the various distribution schemes are described in detail later in the specification). In essence, the process carried out in step 2 is the same as when a trader joins the market via area 3 or area 4.

For example, in FIG. 8B, if a trader clicks in area 1 at price row 10 with a predefined quantity of 400, an order to buy will be sent to market for all available quantities in the market at or better than a price of 10. Using the values shown in ask display region 1712, all available quantities at or better than 10 equals 320 (114+206). All 320 will be filled and, in accordance with step 2 described above, the invention will send the remaining 80 to join the market in accordance with the trader's pre-determined distribution scheme. In other words, the remaining quantity will join the market and be displayed on the trader's screen in the BidQ column in consolidated price row 10. The actual order quantity (or quantities) will be distributed according to the pre-determined distribution scheme.

As described above, a trader who enters the market in area 1 or 2 with a pre-defined quantity greater than the quantity available in the market, will join the market with that excess. By directly clicking on a specific row in area 3 however, a trader elects to "join" the market with a Bid order at the price corresponding to that row. Similarly, by clicking on a specific row in area 4, a trader elects to "join" the market with an Ask order at the price corresponding to that row. "Joining the market" means that the trader will place orders among the existing orders in the market that will not immediately match other orders in the market. Rather, the orders that join the market will only be filled if the market moves and they are matched.

Figure 10:
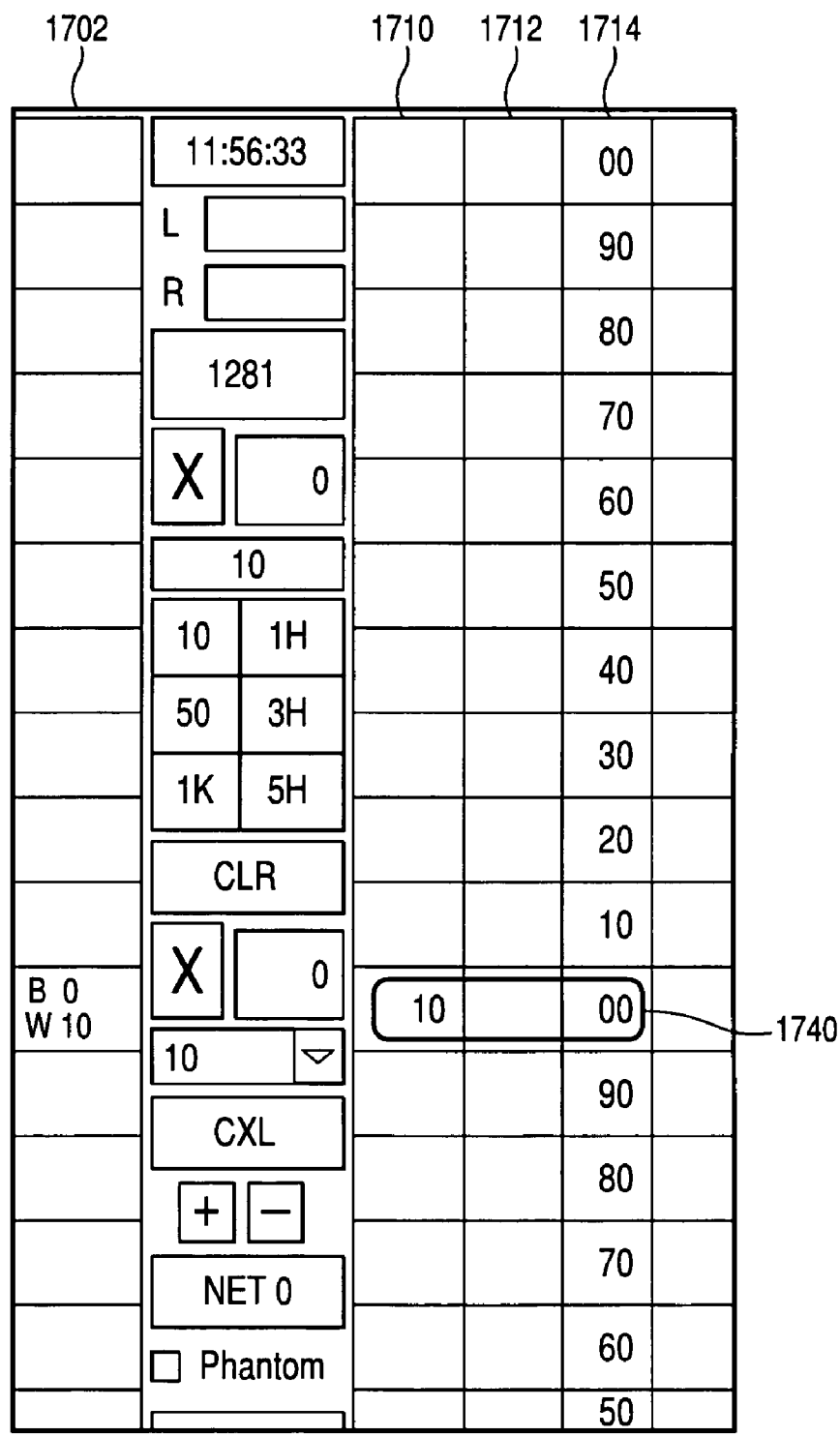
FIG. 10 illustrates a consolidated display with a trade order.

Under the price consolidation feature of the present invention, the orders entered to join the market be grouped in a different manner. FIG. 10 illustrates the consolidated display 1702, but here, unlike previous figures, only the trader's orders are shown. The increment chosen by the trader is 10. As evident from this figure, there is a bid order 1740 for a quantity 10 placed at consolidated price 00. The invention provides the trader with multiple options for distributing the trade order quantity among the prices within the range represented by the consolidated price. The following are examples of such distribution methods shown in unconsolidated displays using FIG. 10 and the trade order shown therein as a reference.

Figures 11, 12:
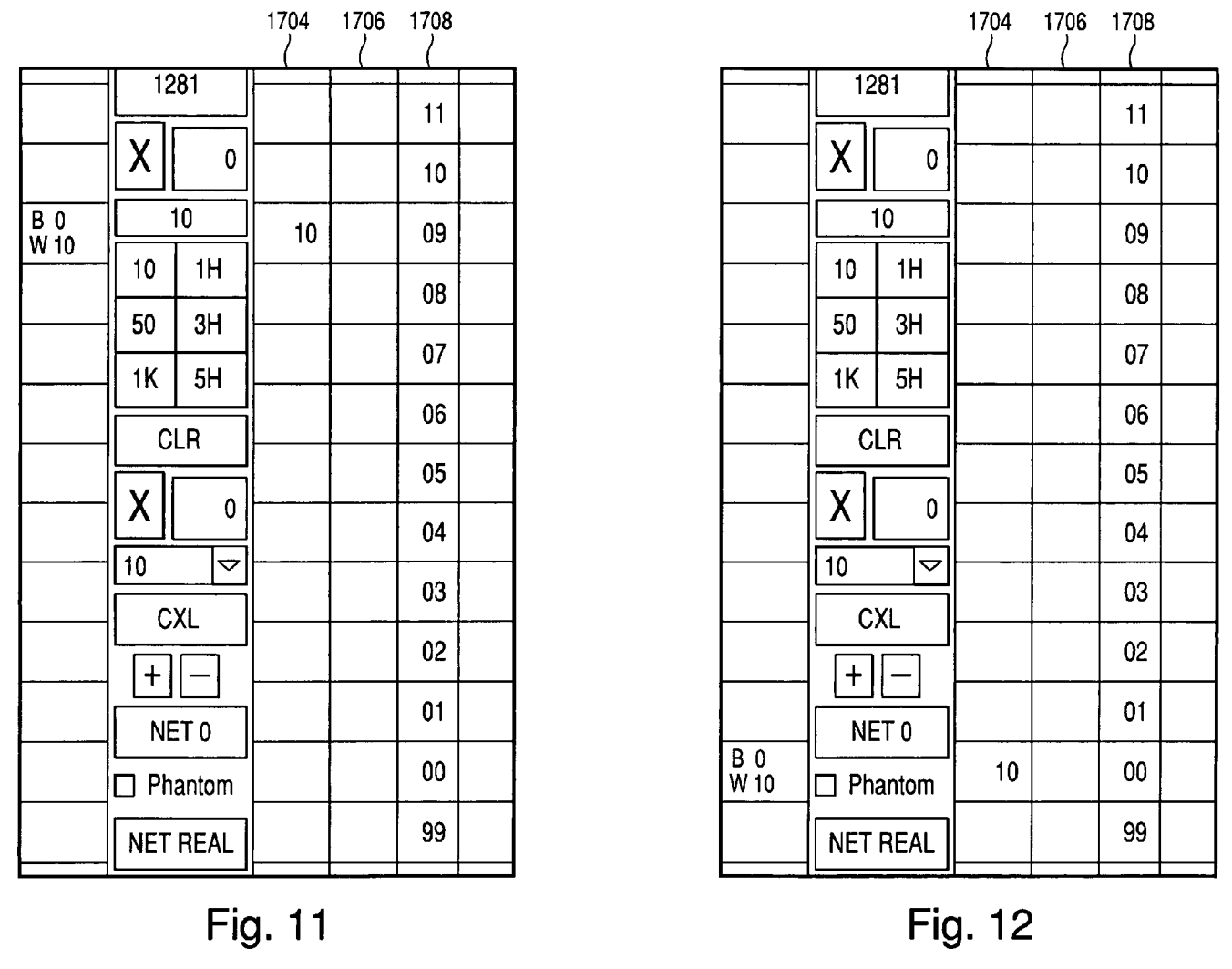

The first option is to allow a single limit order to be entered for the chosen quantity at the best price within the consolidated price row. As shown in FIG. 11, if a trader clicks on the BidQ column 1710 (see FIG. 10) at the 00 consolidated price row, he will join the market in that consolidated price row. If the Bid quantity that he wishes to enter is 10, and he chooses to distribute all 10 orders at the best price, the 10 orders (see 1704) will then be entered at the best price of 09 (see 1708).

Another option under the present invention, as shown in FIG. 12, is to allow a single limit order to be entered for the chosen quantity at the worst price within the consolidated price row. Upon joining the market at the 00 consolidated price row, and choosing to distribute all 10 orders at the worst price, all 10 orders (see 1704) will be entered at the worst price of 00 (see 1708).

Yet another option for distributing an entered order includes an even distribution of multiple orders throughout the prices in the consolidated price row. As shown in FIG. 13, after joining the market at the 00 consolidated price row, and choosing to evenly distribute all 10 order, one order each will be distributed among the 10 price rows that make up the consolidated 00 price row.

A further option is a random distribution of the orders as shown in FIG. 14. The bid quantities shown in column 1704 sum to the order quantity of 10 and are randomly distributed among the prices within the range corresponding to the consolidated price at which the order was placed.

Figures 15, 16:
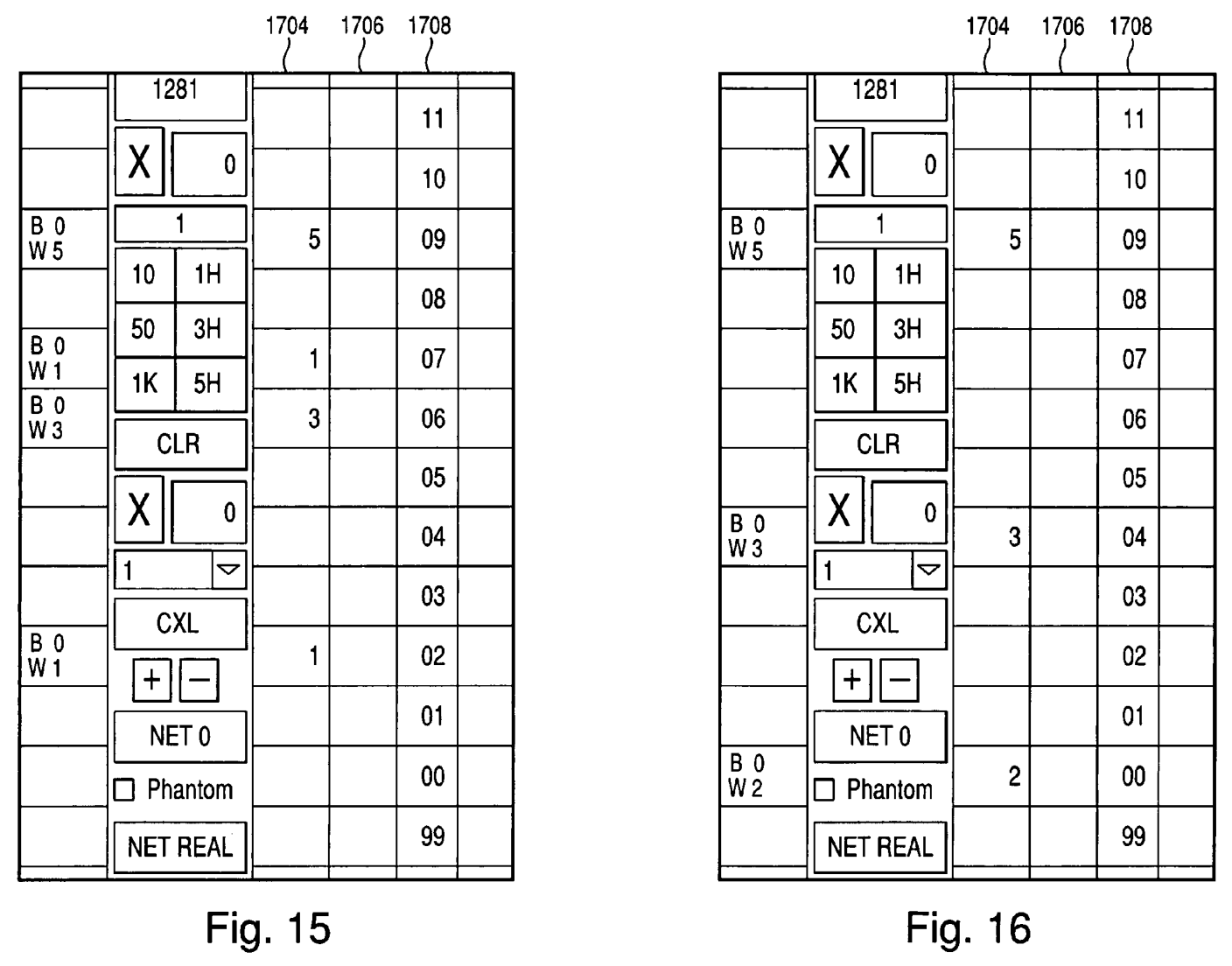

The present invention will also allow a single limit order to be entered for the chosen quantity at both the best price and random prices within the consolidated price row. As shown in FIG. 15, the trader chose to distribute 50% of his 10 orders at the best price and randomly distribute the additional 50% among any of the prices incorporated into the consolidated price row.

Similarly, the present invention allows for the distribution of multiple percentages of orders among the separate prices that make up the consolidated price row. FIG. 16 illustrates orders entered by a trader when he chose to distribute 50% of the 10 orders at the best price, 20% at the worst price, and 30% midway through the best and worst prices.

In addition, the present invention will allow for the distribution of multiple orders from a consolidated price row to be weighted toward the best price. In FIG. 17, the trader chose to weight his 10 orders toward the best price resulting in four orders at the 09 price, three at 08, two at 07, and one at 06.

Much like the distribution explained above, the present invention also allows for the distribution of multiple orders from a consolidated price row to be weighted toward the worst price. FIG. 18 illustrates the result of a trader choosing to weight his 10 orders toward the worst price (four are at the 00 worst price, three at 01, two at 02, and one at 03).

As discussed above, the aforementioned distribution schemes or any combination thereof, can be used to distribute orders that are placed to join the market. Furthermore, they can be used to distribute excess orders, that is, the quantity of the order remaining after the quantity available in the market has been matched. The distribution of trade orders can be accomplished by any convenient programming techniques, including rule-based programming techniques. Also, the randomization in distributing the trade orders can be accomplished through the use of one or more standard randomizing algorithms.

When condensing prices, the market depth may affect the display of consolidated ticks. The order information that is available varies depending on the exchange. Some exchanges offer an infinite number of prices, while others may supply only a limited number. If a trader elects to group ticks into consolidated price rows of five ticks per row, and a particular exchange offers only ten prices, consolidating would be unnecessary because all of the prices could be displayed separately on the screen at the same time.

Flowchart of the Placing Trade Orders Using Price Consolidation

Figure 19:
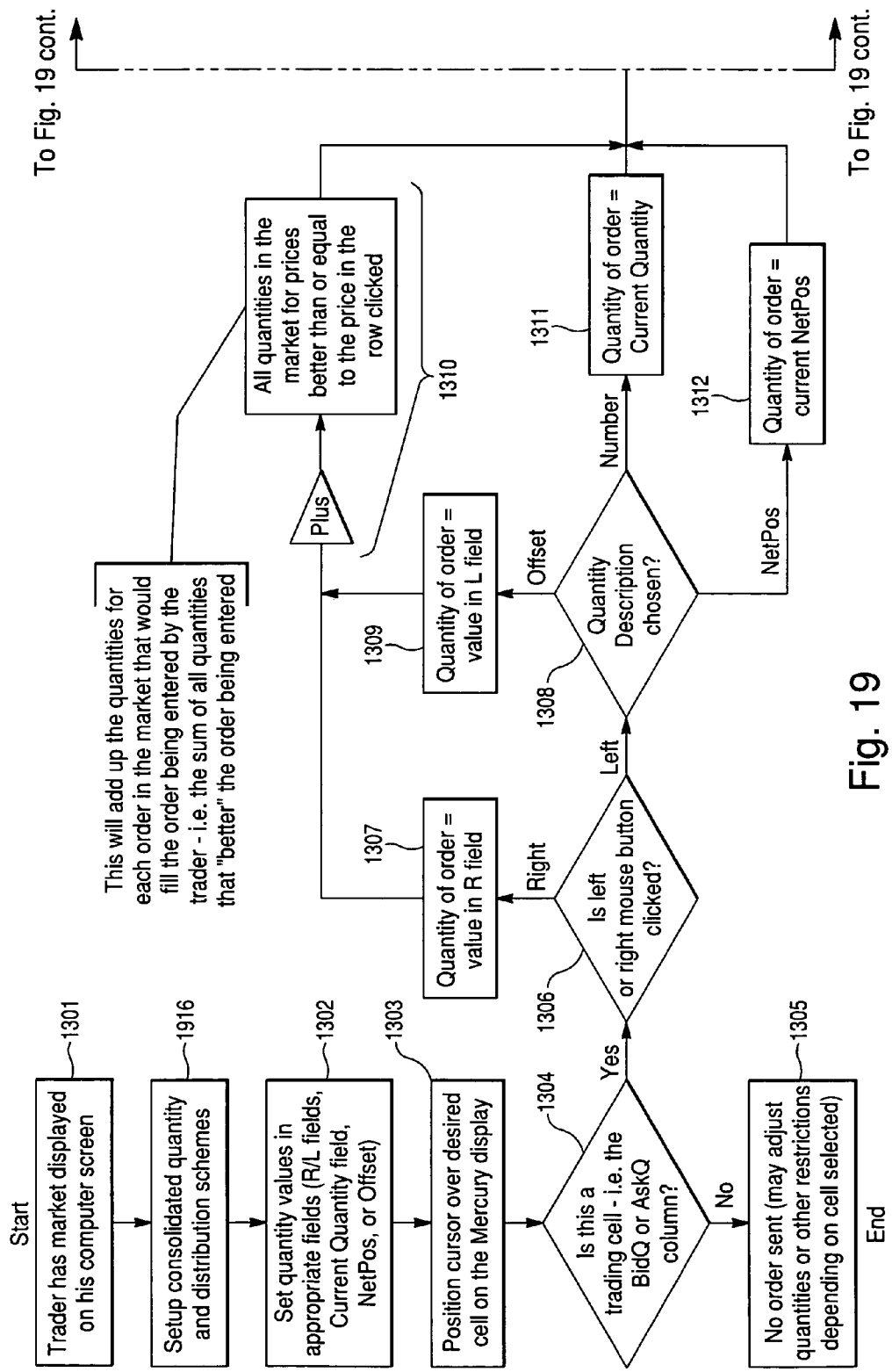
FIG. 19 is a flowchart illustrating the process for trading using the price consolidation feature of the present invention.
Figure 19:
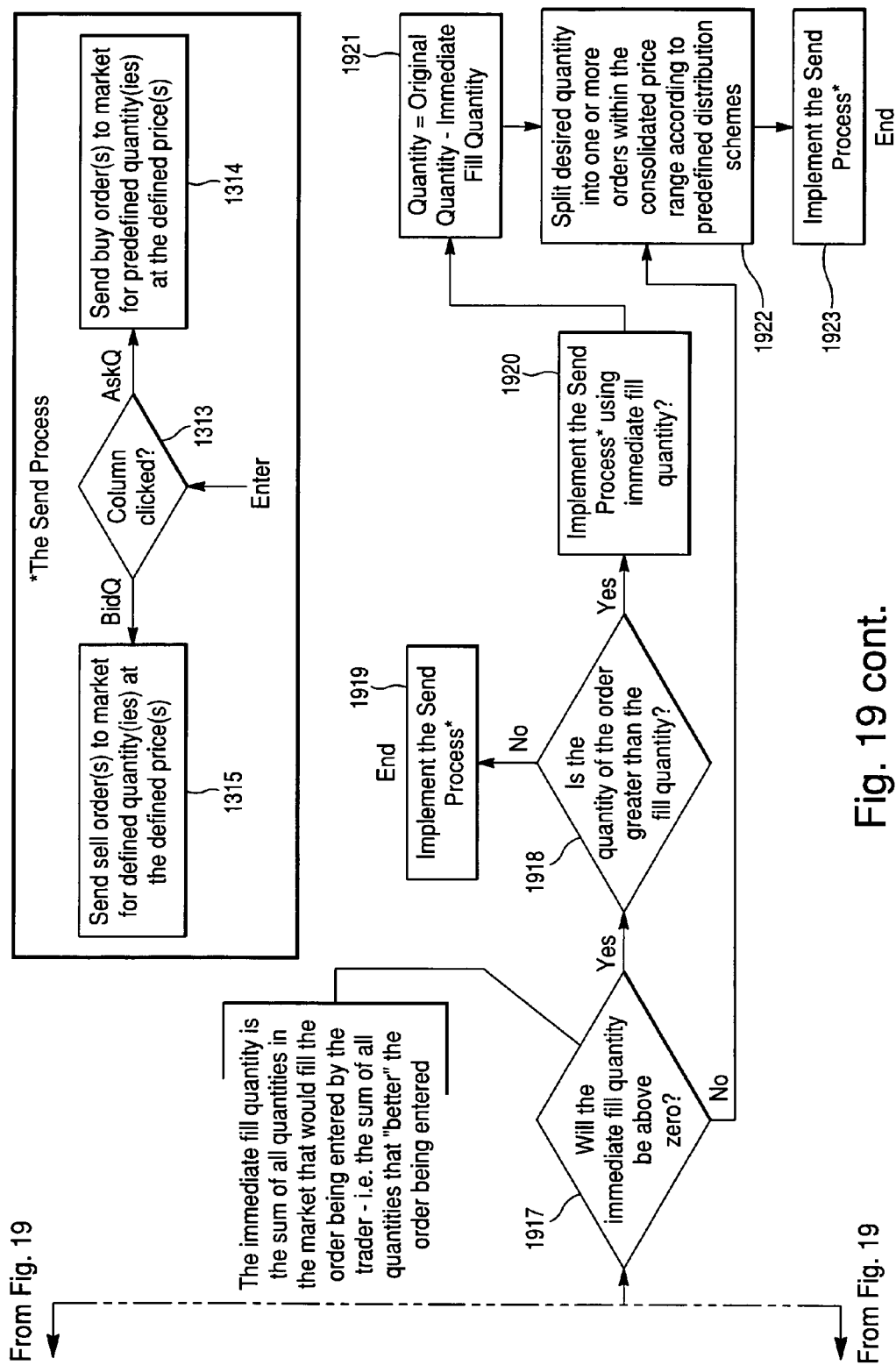

The flowchart shown in FIG. 19 illustrates the trade order placement using price consolidation. It is a modification of that shown in FIG. 6 which illustrates the process described in the parent application. The modifications include a step 1916 for setting up the consolidation quantity (increment) and distribution scheme. The flowchart of FIG. 6 has been altered to illustrate the effect of consolidating price rows. For example, if a trader enters the market and elects to enter a Bid order of 20 commodities at a consolidated price of 00, since that 00 represents a range of prices, the 00 may not be the best market price. The present invention provides that trader with the option of splitting the quantity into one or more orders within the consolidated price range, and therefore potentially entering the market at a better price. In addition, as displayed in step 1916 of FIG. 19, a trader joining the market has the option of setting up consolidation quantity and distribution schemes as discussed above.

The boxes added to the flowchart address the treatment of orders that are "better than" the market price but where the quantity selected is larger than the quantity available in the market. Specifically, the added decision boxes address whether there is any quantity available in the market at the order price or better (step 1917). If not, the order remainder will be placed for the desired quantity in accordance with the predefined distribution scheme (steps 1922 and 1923). If so, the next question addressed is whether the entire quantity ordered is greater than what is available in the market at the order price or better (step 1918). If not, the entire order will be placed (step 1919). If so, the order will be placed for the quantity available in the market (step 1920) and the remainder (step 1921) will be placed in accordance with the predefined distribution scheme (steps 1922 and 1923).

It should be understood that the above description of the invention and specific examples and embodiments, while indicating the preferred embodiments of the present invention are given by demonstration and not limitation. Many changes and modifications within the scope of the present invention may be made without departing from the spirit thereof and the present invention includes all such changes and modifications.

What is claimed is:

1. A method for displaying market information relating to a commodity being traded in a market with a highest bid price and a lowest ask price on a graphical user interface, the method comprising:
    dynamically displaying a plurality of bid indicators in a bid display region in association with price levels arranged along a common static axis of prices, each bid indicator representing quantity associated with a price level;
    dynamically displaying a plurality of ask indicators in an ask display region in association with the price levels arranged along the common static price axis, each ask indicator representing quantity associated with a price level;
    consolidating the price levels of the common static price axis such that a plurality of price levels are combined into a consolidated price level;
    consolidating the display of the plurality of bid and ask indicators into a plurality of consolidated bid and ask indicators so that each consolidated bid and ask indicator represents quantity associated with a plurality of price levels within a consolidated price level.

2. The method of claim 1 wherein the bid and ask display regions comprise columns.

3. The method of claim 1 wherein the bid and ask is play regions are oriented vertically.

4. The method of claim 1 wherein the bid and ask display regions are oriented horizontally.

5. The method of claim 1 wherein the number of prices that are consolidated is adjustable.

6. The method of claim 1 further comprising the step of displaying at least a portion of the common static axis of consolidated prices in a price display region.

7. The method of claim 1 further comprising the steps of:
    displaying a bid order entry region comprising a plurality of locations for receiving commands to send buy orders; and
    displaying an ask order entry region comprising a plurality of locations for receiving commands to send sell orders.

8. The method of claim 7 wherein the bid order entry region comprises the bid display region and the ask order entry region comprises the ask display region.

9. The method of claim 7 wherein the bid and ask order entry regions are displayed in association with the common static axis of consolidated prices such that each of the plurality of locations for receiving commands is associated with a consolidated price level on the common static price axis.

10. The method of claim 1 wherein a bid indicator comprises a blank region in the bid display region.

11. The method of claim 1 wherein an ask indicator comprises a blank region in the ask display region.

12. A computer readable medium having program code recorded thereon for execution on a computer for displaying market information relating to a commodity being traded in a market with a highest bid price and a lowest ask price on a graphical user interface, the program code causing a machine to perform the following method steps:
    dynamically displaying a plurality of bid indicators in a bid display region in association with price levels arranged along a common static axis of prices, each bid indicator representing quantity associated with a price level;
    dynamically displaying a plurality of ask indicators in an ask display region in association with the price levels arranged along the common static price axis, each ask indicator representing quantity associated with a price level;
    consolidating the price levels of the common static price axis such that a plurality of price levels are combined into a consolidated price level; and
    consolidating the display of the plurality of bid and ask indicators into a plurality of consolidated bid and ask indicators so that each consolidated bid and ask indicator represents quantity associated with a plurality of price levels within a consolidated price level.

* * * * *

UNITED STATES PATENT AND TRADEMARK OFFICE
CERTIFICATE OF CORRECTION

| | |
|---|---|
| PATENT NO. | : 7,127,424 B2 |
| APPLICATION NO. | : 09/971087 |
| DATED | : October 24, 2006 |
| INVENTOR(S) | : Kemp, II et al. |

Page 1 of 1

It is certified that error appears in the above-identified patent and that said Letters Patent is hereby corrected as shown below:

On the Title Page
At Item (73), Assignee, please delete "Evanston, IL" and substitute --Chicago, IL--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,127,424 B2 | Page 1 of 1 |
| APPLICATION NO. | : 09/971087 | |
| DATED | : October 24, 2006 | |
| INVENTOR(S) | : Kemp, II et al. | |

It is certified that error appears in the above-identified patent and that said Letters Patent is hereby corrected as shown below:

Claim 3, Column 20, line 6: please delete "is play" and insert --display--.

Signed and Sealed this
Eighth Day of November, 2011

David J. Kappos
*Director of the United States Patent and Trademark Office*